July 10, 1945.  V. BUSH  2,379,862

JUSTIFYING TYPEWRITER

Filed July 31, 1942  12 Sheets-Sheet 1

Inventor: Vannevar Bush,
By Pierce + Scheffler,
Attorneys.

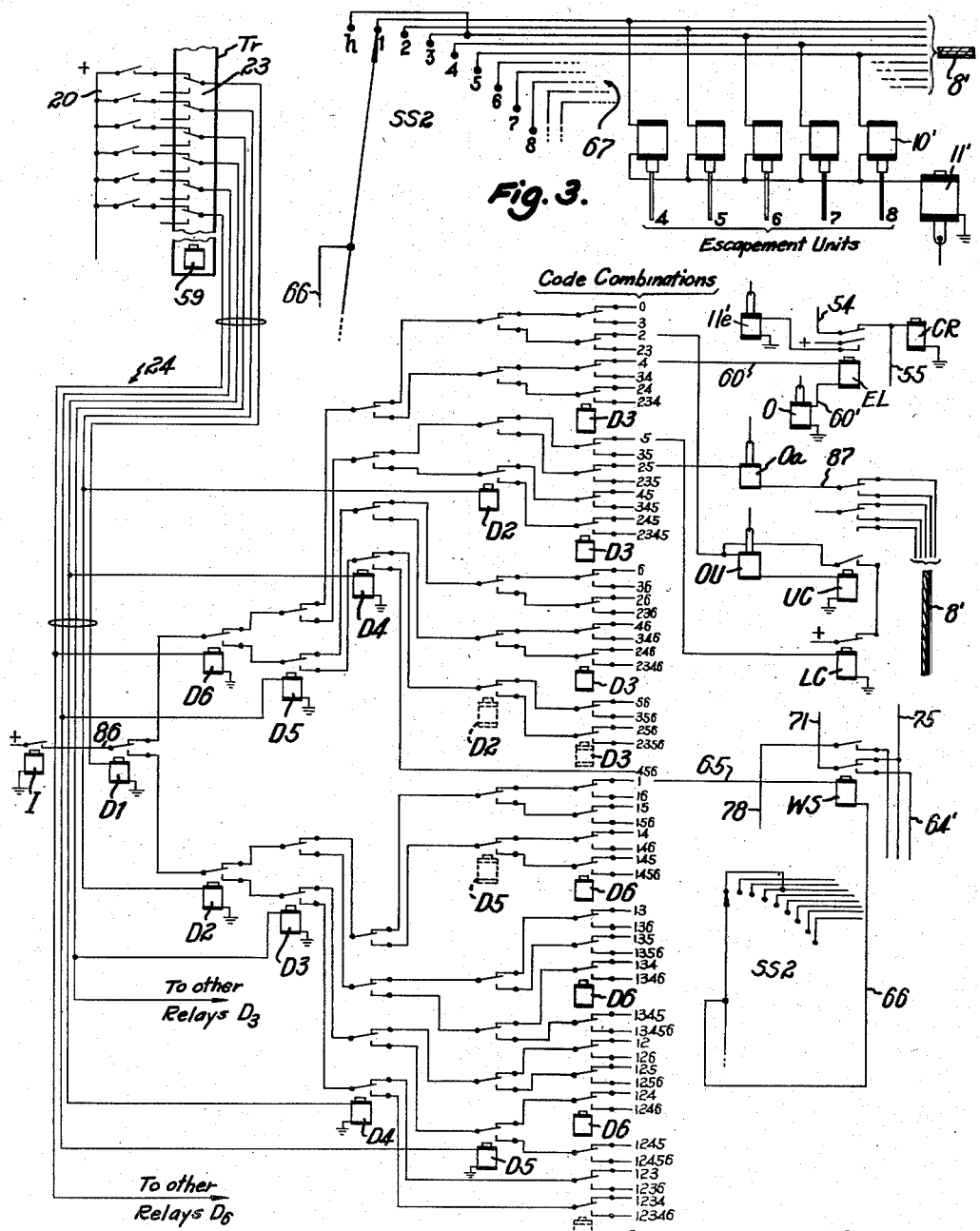

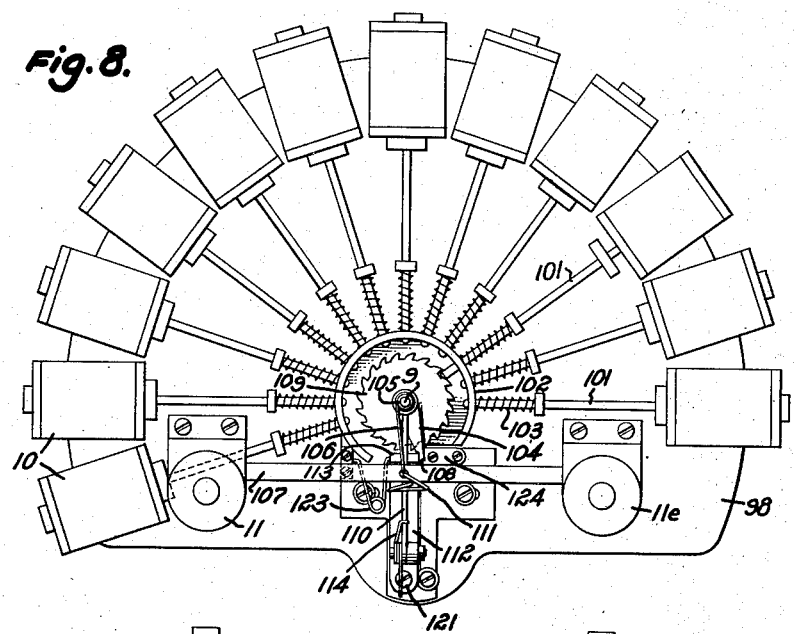

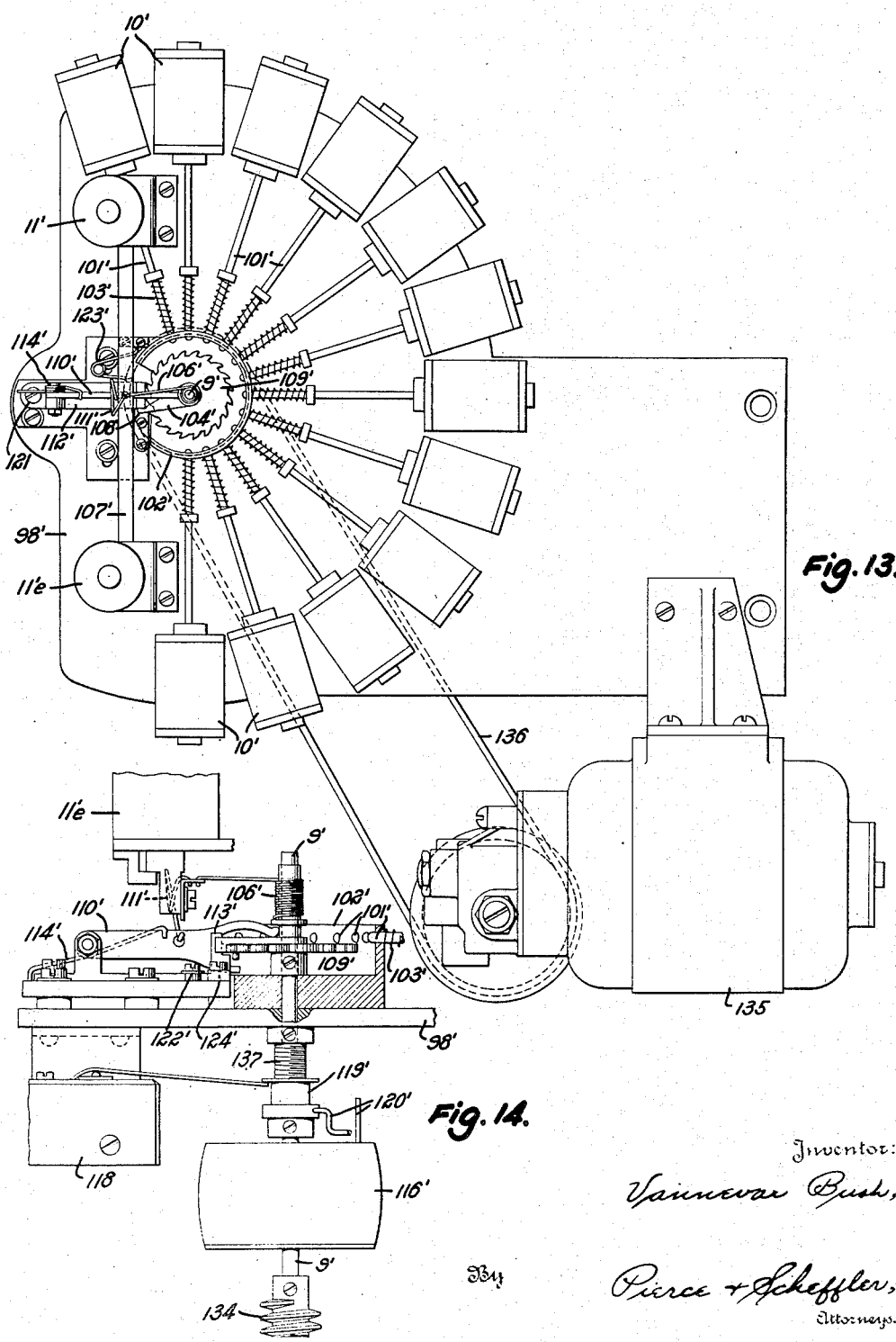

July 10, 1945.    V. BUSH    2,379,862
JUSTIFYING TYPEWRITER
Filed July 31, 1942    12 Sheets-Sheet 10

Inventor:
Vannevar Bush,
By Pierce & Scheffler,
Attorneys.

July 10, 1945. V. BUSH 2,379,862
JUSTIFYING TYPEWRITER
Filed July 31, 1942 12 Sheets-Sheet 11
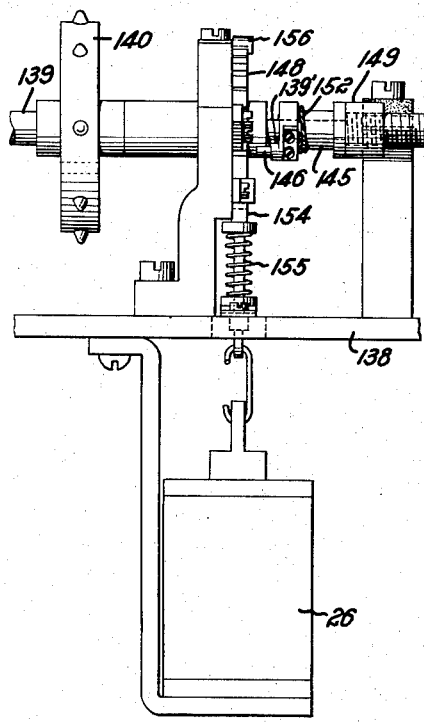
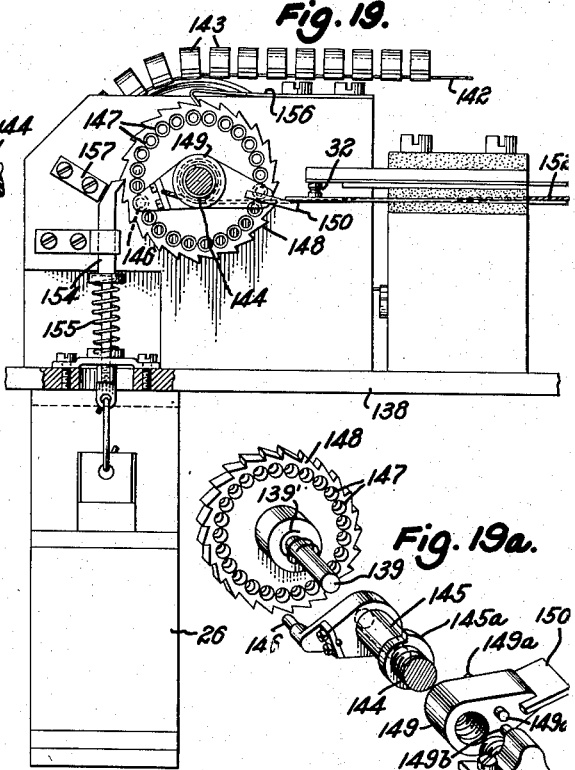
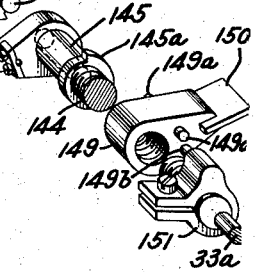
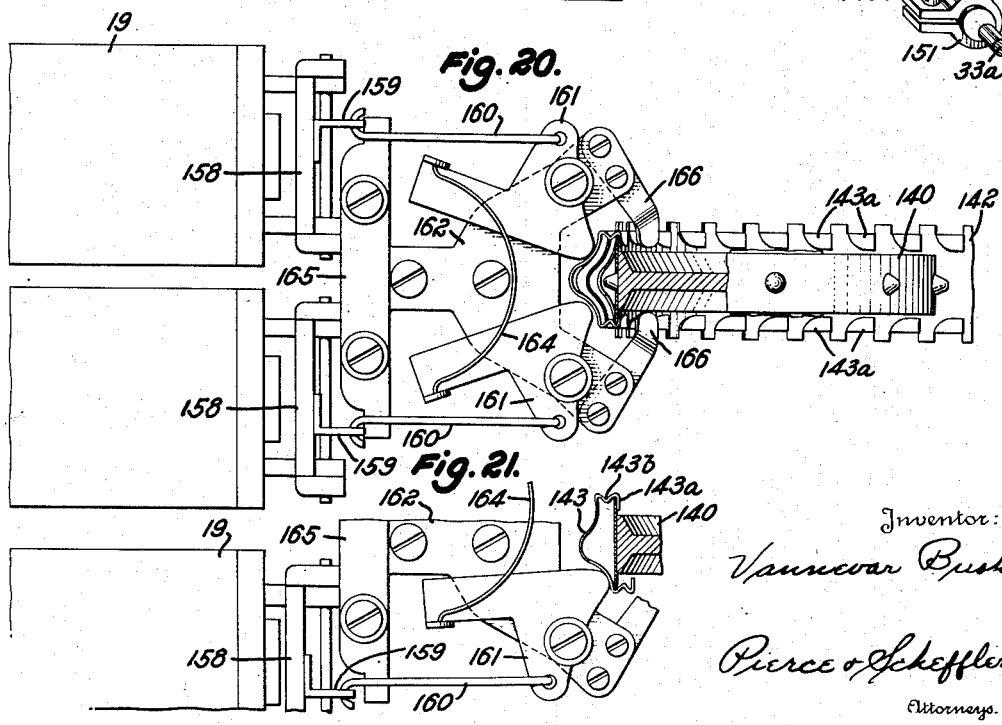

July 10, 1945.  V. BUSH  2,379,862
JUSTIFYING TYPEWRITER
Filed July 31, 1942  12 Sheets-Sheet 12
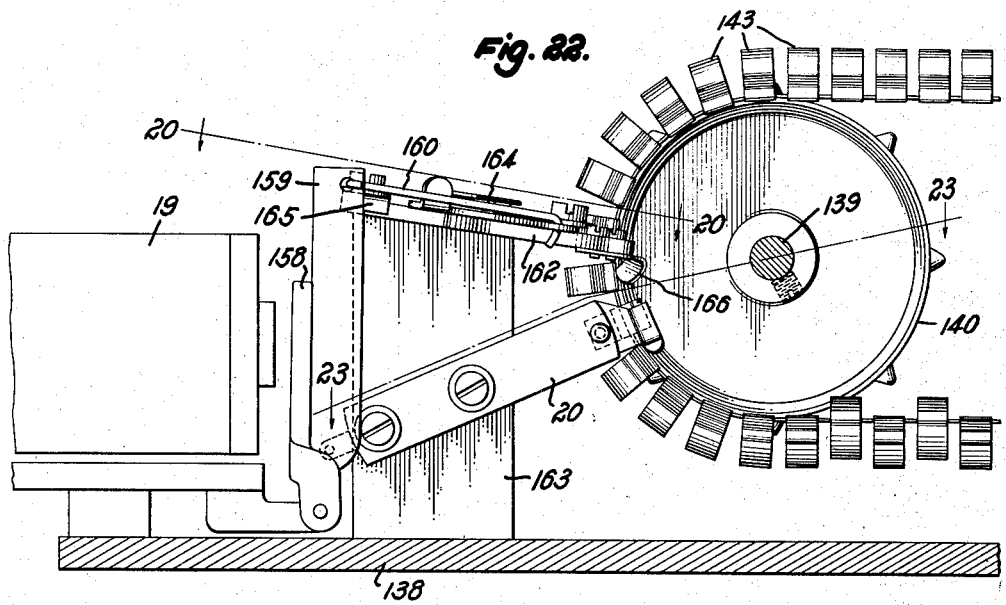
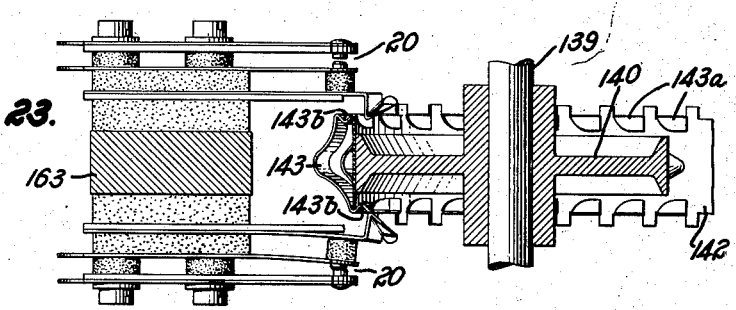
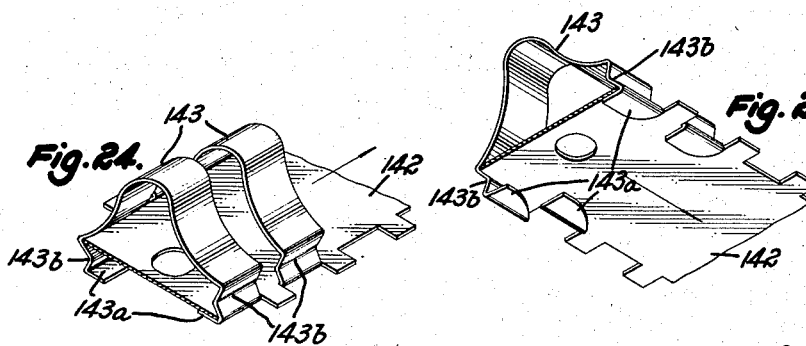
Inventor:
Vannevar Bush,
By Pierce & Scheffler,
Attorneys.

Patented July 10, 1945

2,379,862

UNITED STATES PATENT OFFICE 2,379,862

JUSTIFYING TYPEWRITER

Vannevar Bush, East Jaffrey, N. H., assignor to Research Corporation, New York, N. Y., a corporation of New York Application July 31, 1942, Serial No. 453,090

18 Claims. (Cl. 197—84)

This invention relates to typewriters and more particularly to typewriters that will produce justified type lines by a single keyboard operation.

The ordinary typewriter has an escapement that advances the paper carriage by the same increment for all characters (letters, numerals, punctuation, etc.); and the normally wide characters are crowded to fit within the space while the narrow characters are broadened. The new typewriter has a variable escapement mechanism that eliminates this prior design limitation, and the characters are of different widths with type faces similar to good handset type. The new typewriter differs from the known "justifying" typewriters which have a manual adjustment that must be set for each line as the material is copied from a sheet that was previously typed on the ordinary non-justifying typewriter. The new machine provides an automatic justification of the lines in a single keyboard operation with no manual settings, and the justification is accomplished by increasing the spaces between words without disturbing the spacing of the letters within the words.

The complete line must be "composed" or entered upon the keyboard before the required amount of justification can be determined and it is therefore apparent that the type bars of the typing unit cannot be directly actuated by the typewriter keys. The justifying mechanism must include (1) a memory unit to store up or "remember" the sequence of the characters that the operator sets up on the keyboard, (2) a calculator unit for computing the increase in the word space lengths that is required to fill out the line, and (3) mechanism for adjusting the variable escapement of the typing unit in accordance with the computation of the calculator unit before the character sequence is transcribed from the memory unit to the typing unit. Two memory units are employed in alternation to record the sequence of characters and word spaces of the lines, one memory unit recording a line while the other memory unit transcribes the previous line.

An object of this invention is to provide a typewriter that will produce justified typed lines automatically by a single keyboard operation. An object is to provide an automatic justifying typewriter including a memory unit for recording the sequence of key actuations that set up a line, a typing unit to which the memory unit transcribes the sequence of key actuations, a manually operable key for initiating the transfer of the recorded line from the memory unit to the typing unit, and a non-justifying typewriter directly actuated by the keys, whereby the operator may proofread the non-justified copy of the line before operating the key which controls the printing of the justified line by the typing unit. An object is to provide a justifying typewriter including an electrically operated typing unit, a keyboard unit having banks of switches that are individually closed by the actuation of the character and operation-controlling keys, coding relays controlled by the key-actuated switches to reduce the large number of individual key signals to combinations of a lesser number of code signals, a memory unit for recording the code signal combinations corresponding to the sequence of key operations, and a decoding relay system for converting the recorded code signal combinations into signals for energizing the individual type bars and operation-controlling elements of the typing unit. Another object is to provide a justifying typewriter that includes a memory unit for recording the sequence of key operations in the "typing" of a line on the keyboard, electrical relays for registering the length of the line and the number of word spaces, a calculator for computing the width of the word spaces that is necessary for justification of the line, and a typing unit with a variable escapement for reproducing the line from the record that was stored in the memory unit.

These and other objects and advantages of the invention will be apparent from the following specification when taken with the accompanying drawings in which:

Fig. 3 is a fragmentary circuit diagram of the word space selector switch and associated stop solenoids of the carriage escapement mechanism;

Fig. 4 is a circuit diagram of the decoding system;

Fig. 8 is a plan view of the first variable escapement that is a part of the line length counter mechanism;

Fig. 9 is a side elevation of the same;

Fig. 10 is an enlarged scale fragmentary plan view of the clutch mechanism of the escapement mechanism;

Fig. 11 is a perspective view of the switch systems of the escapement mechanism;

Fig. 13 is an end elevation of the variable escapement of the justifying typewriter;

Fig. 14 is an enlarged scale, fragmentary plan view of the same, with parts shown in section;

Figs. 18 and 19 are enlarged scale, fragmentary end and side elevations, respectively, of the band-advancing mechanism of the memory units, the Fig. 19 section being on the plane of line 19—19 of Fig. 16;

Fig. 19a is a fragmentary perspective view, with parts broken away, of the clutch and associated element of a memory unit;

Fig. 20 is a fragmentary sectional view, as seen on the plane indicated by section line 20—20 of Fig. 22, of a band of a memory unit and the solenoid-operated mechanism for recording a key actuation on the band;

Fig. 21 is a similar fragmentary plan view in which the mechanism is illustrated in the positions assumed upon the energization of a code-recording solenoid;

Fig. 22 is a fragmentary side elevation of the end of a recording band, the associated code-recording mechanism, and decoding switches;

Fig. 23 is a fragmentary sectional view of the band and decoding switches as seen on the section indicated by line 23—23 of Fig. 22; and Figs. 24 and 25 are enlarged scale, perspective views as seen from above and below, respectively, of a portion of a memory unit band and code-recording elements.

Figures 1, 1A:
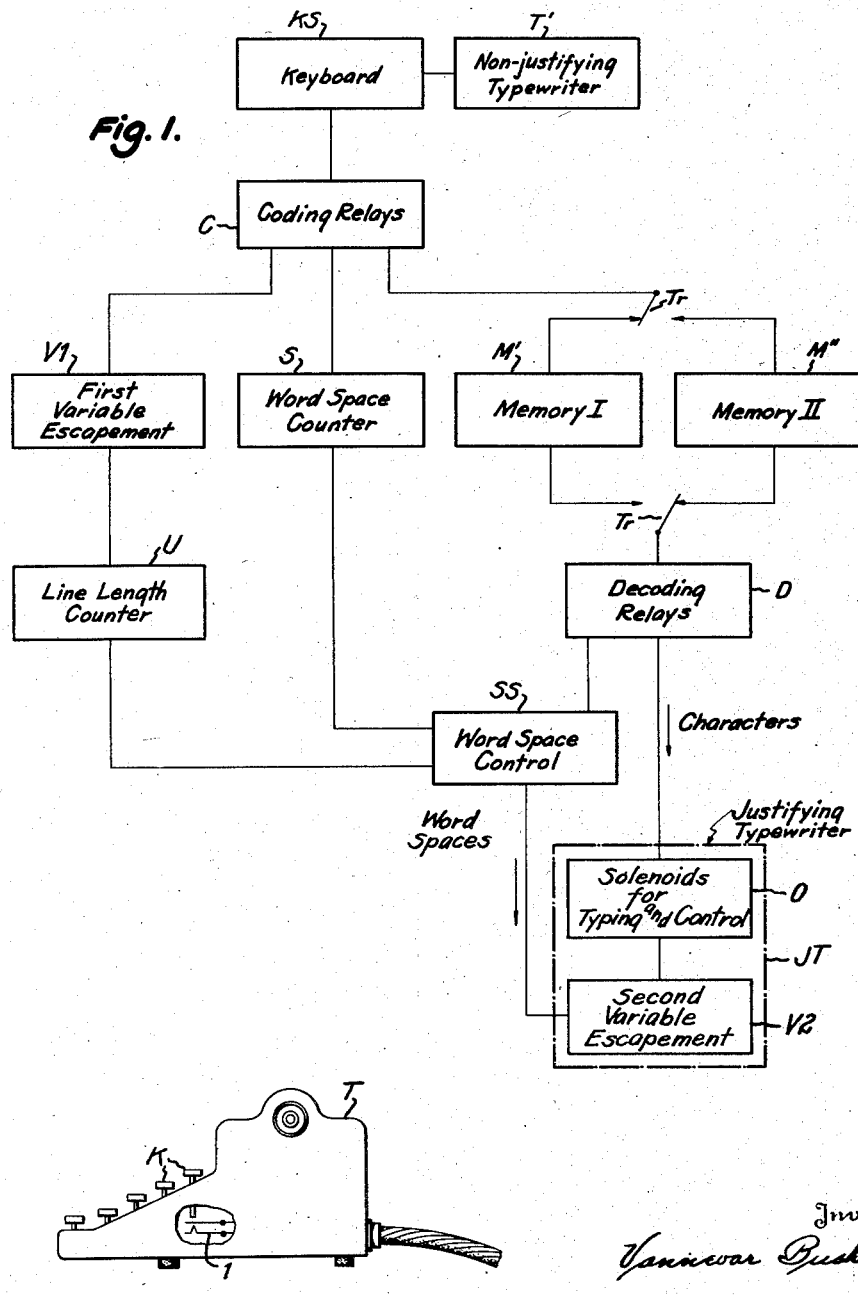
Fig. 1 is a block diagram of the principal elements of a justifying typewriter embodying the invention.
Fig. 1a is a diagrammatic end elevation, with parts broken away, of a keyboard unit for the justifying typewriter, the unit being a conventional non-justifying typewriter to which a bank of key-controlled switches has been added.

The several functional units of the justifying typewriter and their relationships are shown in the block diagram of Fig. 1. The keyboard KS may be a bank of key-operated switches carried by any suitable base but it is preferable to form this unit of the justifying typewriter by mounting the switches 1 below the keys of a conventional non-justifying typewriter T, see Fig. 1a. The key-actuated switches control current flow to individual relays of a bank of coding relays C which reduces the large number of individual key signals to some combination of a small number of code elements. The usual typewriter has about 50 keys or operation-controlling members, and a 6-element code provides 64 combinations that may be used to identify the different key or control member operations. The coding of the signals is not essential but it simplifies the design of the memory units M', M'' which record the sequence of the key operations. The coding relays C have the additional functions of energizing the word space counter S to record the number of word spaces, i. e. the number of operations of the word space bar, and of actuating the first variable escapement V1 in accordance with the width of the several characters and the minimum word space. The accumulated length of the unjustified line is recorded in the line length counter U. When the complete line is recorded in memory unit M', the operator returns the carriage of the non-justifying typewriter T to starting position and in so doing energizes the transfer switches Tr to connect memory unit M' to the decoding relays D and to connect memory unit M'' to the coding relays C. The word space control unit SS divides the difference between the recorded and the justified line length by the number of word spaces to determine the necessary increase for each word space, and records the result as a control to be imposed upon the variable escapement V2 of the justifying typewriter unit JT. At the completion of this computation, the memory unit M' transcribes the recorded line by energizing the decoding relays to select in sequence those operating circuits of the typewriter unit that correspond to the recorded key operations. The current pulses corresponding to characters go directly to the typewriter unit to energize the solenoids O that operate the type bars and to the carriage escapement V2 to advance the same in accordance with the widths assigned to the several characters. The current pulses corresponding to word spaces are shunted through the word space control unit SS in which the computed word space value for line justification was recorded, and this computed value controls the carriage advance by the escapement V2 when a word space is entered in the typed line.

*Coding relays*

Figure 2A:
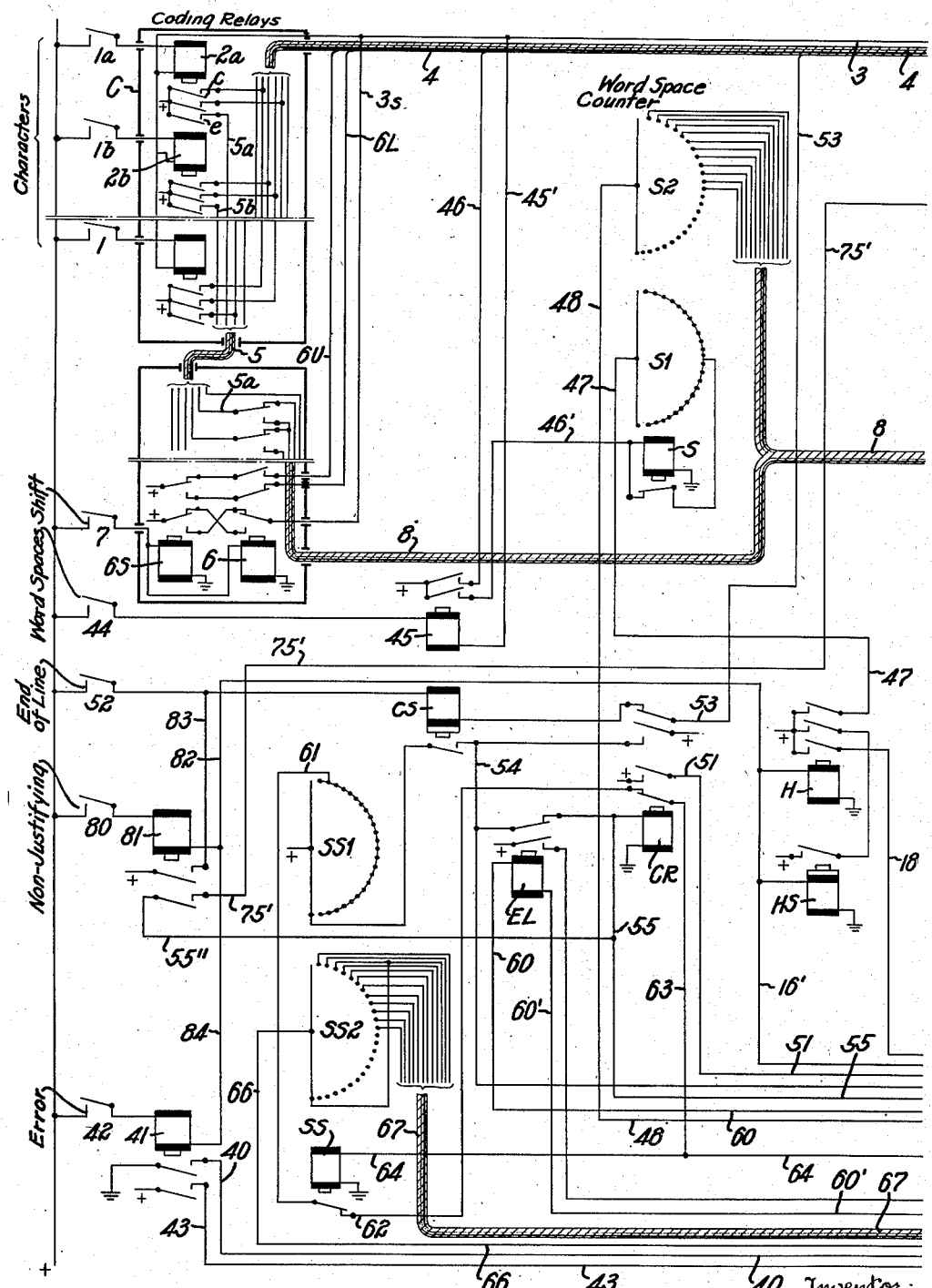
Figs. 2a, 2b and 2c are fragmentary circuit diagrams which, when laterally alined, constitute the circuit diagram of an embodiment of the invention.
Figure 2B:
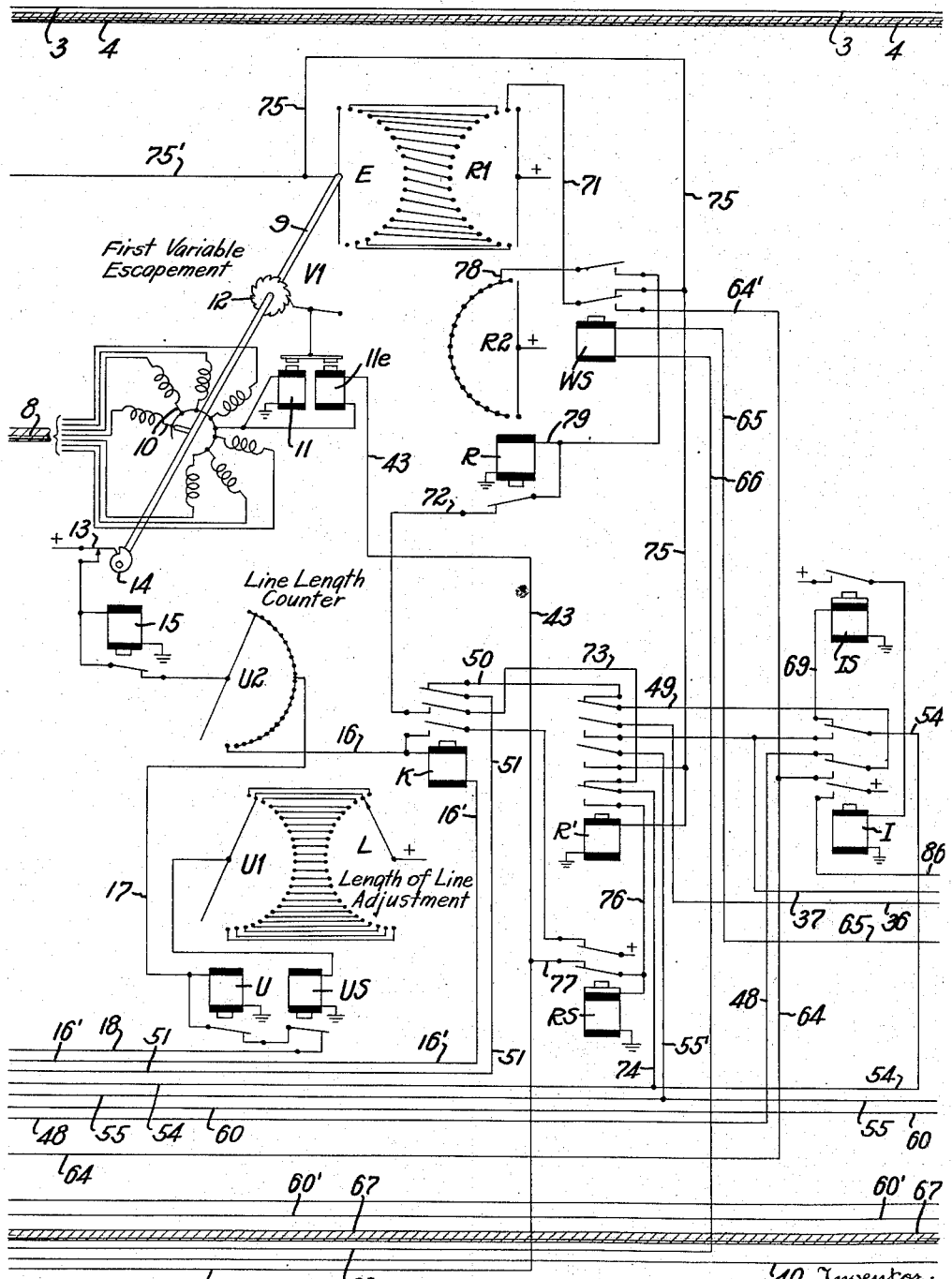
Figure 2C:
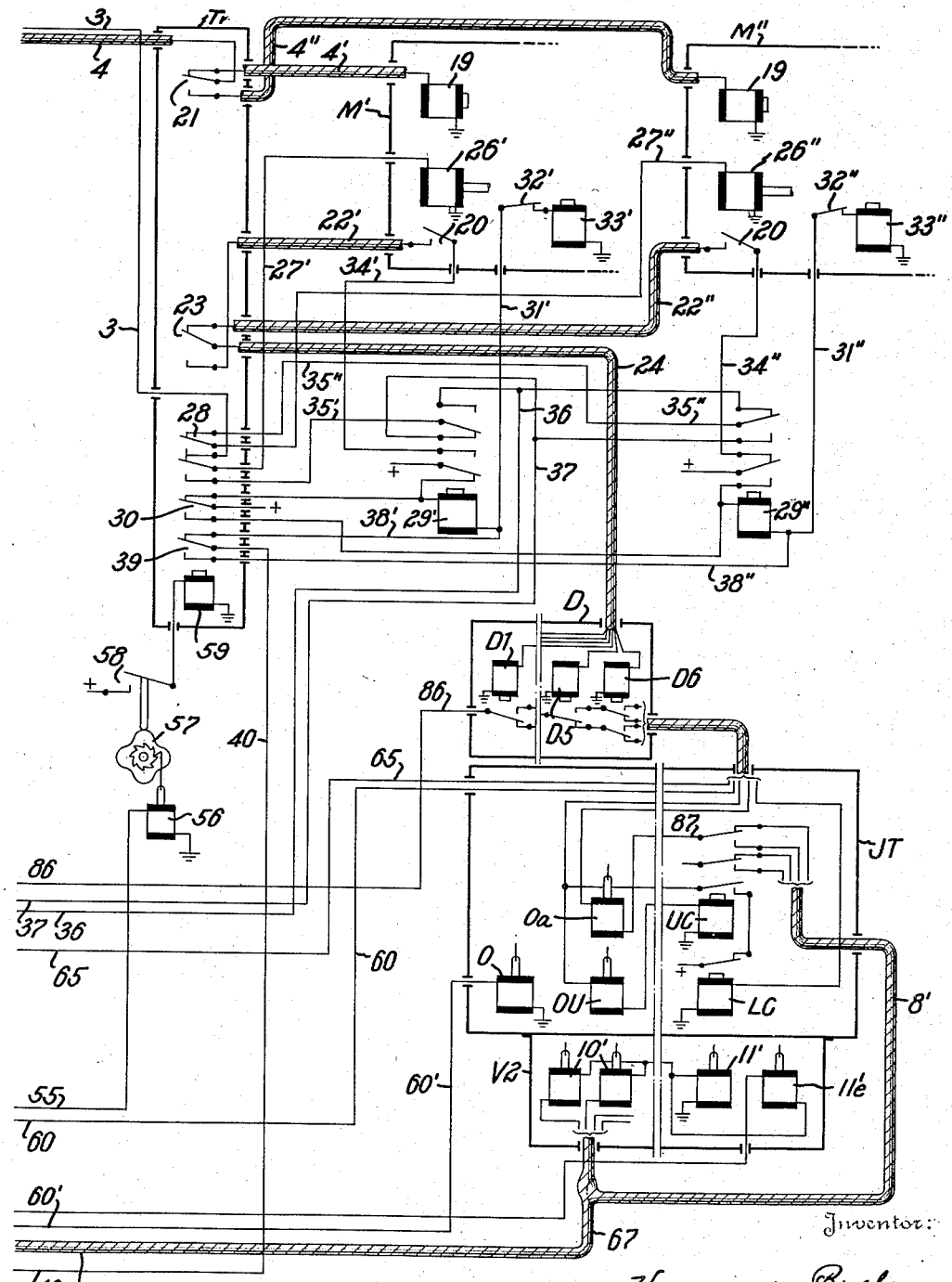

The circuit diagram of the apparatus, Figs. 2a–2c, shows only a few of the character key switches 1a, 1b, etc., as the key switches are all of the illustrated single pole type for completing a circuit from the current source (indicated by the symbol +) through the associated character relay 2a, 2b, etc. in the bank of coding relays C, and then through a common lead 3 to the record-advancing device in the memory unit. Each coding relay, when energized, closes a normally open switch c in the coding system and a normally open switch e in the escapement-control system. Each coding switch c has from one to six movable blades for energizing one or more of the six lines of the coding cable 4 in accordance with the particular code identifications assigned to the letters, numerals and other characters. If the letter "A" has, for example, the code identification "25," the switch c of relay 2a will have two movable blades for connecting the "2" and "5" lines of the code cable to the + terminal of the power source.

*Shift key control*

The blades of the switches e of the coding relays 2 are connected to the + terminal and, in general, the front contacts are connected by leads 5 to the blades of the outer group of double throw switch sections of the relay 6 that is controlled by the "shift key" switch 7 to regulate the space allotted to characters that have "lower case" and "upper case" type faces of different widths. The character spaces are measured in "escapement units" that are substantially smaller than the width of even the narrow letters and symbols, and may vary from three to eighteen units in the particular embodiment that will be described later. The function of the relay 6 is to determine the advance of the escapement mechanism V1 in accordance with the energized coding relay 2 and the position of the shift key switch 7. If, for example, the letter "a" is allotted a space of 9 escapement units and the letter "A" a space of 13 escapement units, the lead 5a from switch e of relay 2a is connected to a blade of relay 6 that has the back and front contacts connected to the "9" and "13" lines, respectively, of the escapement control cable 8. The leads 5 extend from switches e directly to lines of the escapement control cable in the case of coding relays 2 energized by keys whose upper case and lower case characters are of the same width.

The shift key is preferably of the conventional type that may be locked down, at the option of the operator, for typing a group or line of upper case characters. The relay system controlled by key 7 therefore includes a slow-acting relay 6S in parallel with the relay 6, and interconnected switches of these relays for transmitting a signal to the recording memory unit at the closing, and at the opening, of the shift key switch 7. The front and back contacts of the inner double throw switch sections of relays 6S and 6 are reversely connected to each other, the switch blades being connected respectively to the + terminal and, through lead 3s, to the common lead 3 to the record-advancing device of the recording memory unit.

The + terminal is connected to the blade of the outer switch section of relay 6S, and the cooperating contacts are connected to blades of the two single throw switch sections of relay 6 to determine the code signal to be recorded in the memory unit. More specifically, the back contact of the relay 6S is connected to a blade of relay 6 that has a front contact connected by lead 6U to a line of coding cable 4 that corresponds to an upper case or "shift" signal, and the front contact of the relay 6S is connected to a blade of relay 6 that has a back contact connected by lead 6L to another line of the coding relay 4 that corresponds to a lower case or "shift release" signal.

An actuation of the shift key to close the switch 7 energizes the relays 6 and 6S, but the armature of relay 6 responds more quickly than that of the slow-acting relay 6S. The outer blade of relay 6 thus connects the lead 6U to transmit an "upper case" signal to the recording memory unit before the blades of relay 6S move to engage their front contacts. The inner blade of relay 6 functions at the same time to send a current pulse through leads 3s, 3 to the record-advancing device of the memory unit. These impulse-transmitting circuits are then opened when the armature of the slow-acting relay 6S is attracted to its core. The shift key may be released after a single character key or a number of character keys are operated. The armature of relay 6 is released quickly upon an opening of switch 7, and the intermediate blade of relay 6 thus connects the lead 6L, corresponding to a "lower case" signal, to the + terminal through the front contact of the outer blade of relay 6S before the armature of that relay is released. The inner blade of relay 6 engages its back contact before the inner blade of relay 6S leaves its front contact, and a current pulse is thereby transmitted to the record-advancing device of the memory unit. The armature of the slow-acting relay 6S then drops out to open these circuits, as shown in Fig. 2a.

First variable escapement V1

The variable escapement includes a shaft 9 that is turned clockwise by a spring, not shown in Fig. 2b, when a current pulse is transmitted through the selected line of the cable 8 to one of the stop-solenoids 10 and to the escapement-trip solenoid 11 which controls the shaft advance device that is shown schematically as a pawl and ratchet 12. The circuits of all of the stop-solenoids 10 are completed to ground through the solenoid 11, and a second energizing circuit for solenoid 11 includes the zero resetting solenoid 11e. The stop-solenoids 10 are radially arranged about the shaft 9 and selectively project stop members, not shown in Fig. 2b, into the path of a radial lug on the shaft 9. This illustration of the escapement control is schematic and intended to facilitate an understanding of the correlation of the operations that are effected or controlled by the solenoids 10, 11 and 11e. Appropriate physical structure will be described later and, for present purposes, it is sufficient to state that each escapement advance is effected by the transmission of a current pulse through one of the stop-solenoids 10 and the escapement-trip solenoid 11 in series. The energized stop-solenoid determines the number of units of angular advance of the shaft 9 that is effected when the pawl and ratchet 12 is tripped by the solenoid 11. When the solenoids 11 and 11e are simultaneously energized, the pawl and ratchet is tripped to reset the shaft 9 to a definite zero position before the starting of a line length measurement.

Line length counter

The length of the composed line is recorded in terms of rotations of the shaft 9, each rotation corresponding to a large number, for example twenty, escapement units. The shaft rotations or groups of twenty units are recorded by stepping relay U in bank U2 of a stepping switch by a circuit including a switch 13 controlled by a cam 14 on the shaft 9. The blades of the stepping relay U, and of all stepping relays of the apparatus, rotate clockwise. Switch 13 energizes the relay 15 once for each rotation of the shaft to transmit a current pulse to the brush of the switch bank U2 through the contacts of relay 15 before they open. The end contact of the bank U2 is connected through lead 16 to the relay K of the computing system, and all other contacts are connected through the lead 17 to the stepping relay U. For simplicity of illustration, a single bank U2 of 25 contacts and a diametrical brush are shown but it is usually preferable to employ two switch banks with oppositely directed radial brushes, thereby adapting the line length counter to register up to 50 rotations of the shaft 9 of the variable escapement. This permits a maximum of about 100 characters in the average line of the maximum length, but there is no critical upper limit to the line length and the apparatus may be designed for longer line lengths by employing a stepping switch that will record a greater number of rotations of the escapement shaft 9.

The length of the justified typed line may be adjusted manually by the line-length switch L which has contacts connected to the contacts of the switch bank U1 of the stepping switch, and a contact arm that is connected to the + terminal of the power source. The brush of the switch bank U1 is grounded through the "line stop" relay US which has normally closed contacts in series with the stepping relay U and its normally closed contacts, and with the resetting lead 18 that extends to the + terminal through normally open contacts of the relay H that will be described later.

The effective length of the justified line is determined by the number of steps or contacts between the "hot" contact of bank U1 and the end contact, each step corresponding to one rotation of the shaft 9 and thereby to twenty escapement units. The longest line length is obtained when the contact arm of the line length switch L is moved clockwise to engage the upper switch point, and the line length is decreased in steps of twenty escapement units as the contact arm is turned to shift the "hot" contact of bank U1 towards the end contact. The blades of switch banks U1, U2 are reset to bring the blade of bank U1 on the hot contact at the end of one justification-computing operation, i. e. the recording of the length of the next composed line starts with the blade of bank U1 in the position illustrated in Fig. 2b.

The shaft 9 of the escapement mechanism carries the blade of a 20 point switch E that registers the escapement units or partial rotations of the switch 9 beyond the full rotations that are registered in the switch bank U2. The several contacts of the switch E are connected, in reverse sense, to the 20 contacts of the switch bank R1 of a "negative remainder" counter or stepping switch of the justification computing system.

*Memory unit*

The memory units M', M" are of identical design, and appropriate physical constructions will be described later. For an understanding of the electrical circuits of the memory units, it may be assumed that each unit includes a movable band or bands upon which the keyboard switch operations are recorded in code combinations by one or more of six coding devices, and six decoding switches that are subsequently closed by the movable band or bands in accordance with the recorded codings. In Fig. 2c only one recording magnet 19 and one decoding switch 20 are illustrated. The several lines of the coding cable 4 are connected to recording magnets 19 of one or the other memory unit through the double throw switches 21 of the transfer device Tr and the cables 4', 4" that extend from the transfer switches to the respective memory units. The several decoding switches 20 of the memory units are connected through decoding cables 22', 22" to the fixed contacts of double throw transfer switches 23 in the transfer device Tr, and the movable blades of these switches 23 are connected through the decoding cable 24 to the assembly of decoding relays, indicated generally by the block diagram D, that selectively establish circuits for energizing the several operations-controlling and character-printing solenoids of the electrically operated justifying typewriter JT.

Memory units M', M" include solenoids 26', 26" for effecting a step-by-step advance of the recording band or bands, the leads 27', 27" for energizing the solenoids extending to the movable blades of the double pole, double throw switch section 28 of the transfer device Tr. The switch 28 connects the leads 27', 27", in alternation depending upon the recording or transcribing function of the memory units, to the lead 3 from the coding relay bank C or to the outer movable blades of double throw switch units of memory relays 29', 29" that are alternatively energized through the switch section 30 of the transfer device Tr. With the parts in the positions illustrated in Fig. 2c, the transfer device Tr connects the coding cable 4 to memory unit M' for the recording of key operations, and connects memory unit M" to the justifying typewriter JT through the decoding cable 24 for the transcribing of the character and operations signals that were previously recorded in the memory unit M". Each recorded signal is "erased" or removed from the moving bands after the signal passes the decoding switches 20.

The circuits of the memory relays 29', 29" are completed to ground through the leads 31', 31", normally closed clutch switches 32', 32", and clutch-operating solenoids 33', 33" of the respective memory units M', M". Each memory relay 29' or 29", when initially energized by the switch section 30 of the transfer device Tr, completes a holding circuit through the front contact of the inner double-throw switch section of the energized relay. The back contacts of these switch sections of relays 29', 29" connect the + terminal to the decoding switches 20 of memory units M', M" through leads 34', 34", respectively. The outer sets of double throw switches of the memory relays complete circuits for supplying current pulses to the band-advancing solenoids 26', 26" at the completion of a recording operation and during a transcribing operation. The lead 27', 27" that is not connected by the transfer switch section 28 to lead 3 is connected, through jumper 35' or 35", respectively, to the movable blade of the outer switch section of the associated memory relays 29', 29". The back contacts of these switch sections are connected to each other and, through lead 36, to the blade of the intermediate single throw switch section of relay R' of the justification computing system, the front contact being joined to the outer switch section of the impulse relay I and, through lead 37, to the front contacts of the outer switch sections of both memory relays 29', 29".

When, as illustrated, the transfer switch 28 is adjusted to energize the relay 29' of the memory unit M' for a recording of key actuations in that unit, the band-advancing solenoid 26' is connected through lead 27' and switch 28 to the lead 3 from the coding relays C, and the band-advancing solenoid 26" of the memory unit M" is connected to current-supply contacts of the impulse relay I through lead 27", switch 28, lead 35", the outer front contact of relay 29" and the lead 36.

The several switches of the transfer device Tr will be shifted to their alternative positions at the completion of the recording of a composed line in memory unit M', and the switch section 30 will then transfer the + terminal connection to the memory relay 29" of unit M" to condition the same for a recording operation, but the relay 29' of unit M' will remain locked-in by its holding switch section. The band-advancing solenoid 26" of unit M" will then be connected to the lead 3 from the coding relays C by switch 28, and the corresponding band-advance solenoid 26' of unit M' will be connected to switch contacts of impulse relay I through lead 27', switch 28, lead 35', and the front contact of the outer switch section of relay 29'.

The stated actuation of the transfer device Tr connected the coding cable 4 to the recording magnets 19 of memory unit M" at the switch 21, and connected the decoding switches 20 of memory unit M' to the decoding cable 24 at switches 23. The switches 20 of unit M' are not connected to the + terminal, however, so long as the relay 29' remains energized through its holding switch. Relay 29' is de-energized by the opening of the switch 32' which is a limit switch actuated by a measuring device that is coupled to the movable recording band by the clutch solenoid 33'. The number of coded signals in a recorded line will vary with the average width of the series of signals, and the recording bands must have a length at least equal to the maximum number of signals that may constitute a line plus the maximum number of "steps" that the bands are advanced during the computation of the line justification. The function of the clutch solenoid 33' and the measuring device is to open the switch 32' only when the first signal placed on the band, after an energization of the clutch solenoid 33', is under the decoding switches 20 to actuate the same to deliver current pulses to the decoding relays D upon the next energization of impulse relay I to effect a step advance of the bands. In other words, switch 32' is opened to deenergize relay 29', thereby connecting the + terminal to the decoding switches 20 only when the first signal to be transcribed is under and has actuated the decoding switches.

"Erasure" of errors

This control of the switch 32' as a function of the travel of the bands after an energization of the clutch solenoid 33' provides means for "erasing" a sequence of key operations that are recorded in the memory unit. The operator may detect an error in key actuation before the composing of a line upon the keyboard is completed, or may wish to cancel a composed line, whether or not it contains a typographical error, after inspecting the line that is typed on the non-justifying typewriter T by the actuation of the keys that close the switches 1. The clutch solenoids 33', 33" may be de-energized during a recording operation in the associated memory unit M' or M", thereby to reset the measuring device, by grounding the leads 31', 31". Jumpers 38', 38" extend from these leads to the opposed contacts of the transfer switch section 39 that has a blade connected to ground through the lead 40 and the inner normally open contacts of a relay 41 that is energized by the closing of an "error" switch 42 at the keyboard. The outer contacts of the relay 41 connect the + terminal to a lead 43 that extends to the resetting solenoid 11e of the first variable escapement V1 and the word space counter S. A closure of the error key switch 42 thus shorts out and de-energizes the associated clutch solenoid 33' or 33" to render ineffective the previously recorded signals since, as stated above, the measuring device controlled by the clutch solenoid will not open the switch 32' or 32" until, after an energization of the clutch solenoid, the first recorded code signal is in engagement with the decoding switches to transmit decoding current pulses upon the next energization of the relay I. All signals recorded prior to the last energization of the clutch solenoid therefore move idly past the decoding switches 20 which are not connected to the + terminal until the associated memory relay 29' or 29" is de-energized.

The closure of the error key switch 42 also functions, as will be described later, to reset the variable escapement mechanism V1 and the word space counter.

Word space counter

The keyboard space bar actuates switch 44 to close a series circuit from the + terminal to the word space coding relay 45, the lead 45' to lead 3, and then through the transfer switch 28 to the band-advancing solenoid 26' or 26" of the recording memory unit. Energization of relay 45 closes the associated contacts to connect the + terminal to a line of the coding cable 4 through lead 46, and to the stepping solenoid S of the word space counting switch through lead 46'. The blade of the bank S1 of the counting switch is connected to the + terminal through lead 47 and contacts of relay H when the latter is energized. The end contact of the bank S1 is open, and all other contacts are joined to each other and to lead 46' through the normally closed contacts of the stepping solenoid S. The switch bank S2 is a part of the justification computing system, the contacts of the bank being connected to the several lines of the escapement cable 8, and thereby to the stop controlling soelnoids of the variable escapement V1. The blade of bank S2 is connected through lead 48 to the back contact and intermediate blade of impulse relay I, lead 49, the outer blade and back contact of relay R', lead 50, the outer back contact and blade of relay K, and then through lead 51 and normally open contacts of the carriage return relay CR to the + terminal, the contacts being closed to initiate a justification computation when the carriage return relay is energized at the completion of line recording operation.

Carriage return

The carriage return switch 52 is closed by a manually actuated key or by the operation of the carriage return lever when a conventional typewriter, as modified for key actuation of the character and operations-controlling switches, is employed as the keyboard unit of the justifying typewriter. The circuit of the switch 52 extends from the + terminal through the slow acting relay CS and the outer set of normally closed contacts of the carriage return relay CR to the lead 53 that extends to a line of the coding cable 4, for example to line "4." The closing of the carriage return switch 52 thus records a coded carriage-return or end-of-line signal in the memory unit. The primary circuit for energizing the carriage return relay CR may be traced from the relay back to the + terminal through the normally closed outer contacts of the end-of-line relay EL, jumper 54, the normally open contacts of relay CS, the "home" contact of the switch bank SS1 of the word space selector stepping switch, and the blade of the bank SS1. A holding circuit for the relay CR is closed from the jumper 54 through the outer set of normally open contacts of the relay. The lead 55 extends from the energizing circuit of relay CR, at a point beyond the contacts of relay EL, to the solenoid 56 of the pawl and ratchet mechanism 57 for alternately opening and closing the switch 58 of the solenoid 59 of the transfer switches Tr.

As stated above, the energizing current for the slow-acting relay CS also serves to record an end-of-line signal in the memory unit through the lead 53 and a line of the coding cable 4. Energization of relay CS closes contacts in the supply circuit of the carriage return relay CR, but the relay CR is energized only when the brush of the space selector switch bank SS1 is at its home point, i. e. only after the completion of the transcribing of the previously composed line from the other memory unit to the justifying typewriter mechanism. This will be the normal operating condition as the transcribing of the previously composed line from one memory unit will usually be completed more rapidly than the "typing" of a new line for recording in the other memory unit.

Energization of the carriage return relay CR opens its outer relay contacts in the lead 53 and thereby de-energizes the coding element that had previously placed the end-of-line signal on the recording memory unit. The relay CR is locked in through its holding contacts and the normally closed outer contacts of the relay EL, and is de-energized at the completion of the transcription of the recorded line into the typewriter JT upon the transmission of a code current pulse to the relay EL. Lead 60 connects the relay EL to the code line "4" of the decoding system, and the energizing circuit of the relay is completed through the lead 60' and the carriage return solenoid O of the justifying typewriter JT, see Fig. 4. The relay EL has a second set of normally open contacts for completing a circuit to energize the resetting solenoid 11'e of the escapement mechanism of the justifying typewriter.

*Word space selector switch*

As stated above, the circuit for energizing the carriage return relay CR extends through the brush and the homing contact of the bank SS1 of the word space selector switch. All other contacts of the bank are connected to each other and, through lead 61, to the normally closed contacts of the stepping relay SS, lead 62, the normally closed inner contacts of the carriage return relay CR, and jumper 63 to the energizing lead 64 of the stepping relay SS. This energizing lead 64 extends from relay SS to the front contact of the intermediate movable contact blade of the impulse relay I of the computing mechanism, and through the branch lead 64' to the front contact of the inner movable contact blade of a relay WS that is energized by current pulses transmitted through lead 65 from the decoding bank of switches D of the justifying typewriter. The blade of the switch bank SS2 is connected in series with the relay WS by lead 66, and the contacts of the bank SS2 are individually connected through the escapement control cable 67 to the several stop-solenoids 10' of the carriage escapement mechanism V2 of the justifying typewriter unit. The position of the blade of the bank SS2 is determined, as will be described later, by the computing system which divides the line remainder by the number of recorded word spaces. Each decoded word space signal thus flows, in series, through relay WS, the lead 66, the switch bank SS2, and the escapement control cable 67 to control the advance of the typewriter carriage. The several stop-solenoids 10' are returned to ground through the carriage release trip to solenoid 11' in the same manner as described above with respect to the variable escapement V1.

*Justification computing and control mechanism*

The composed line length is justified by increasing the widths of the word spaces during the transcribing from a memory unit to the justifying typewriter, and the computation of the justification is completed prior to the transcribing operation. The number of escapement units to be added to the original word space width is determined by dividing the line shortage $u$ (i. e. the difference between the composed line length as accumulated by the variable escapement V1 in the line length counter U and the desired line length as set on the manually adjustable switch L) by the number $s$ of word spaces recorded in the bank S1 of the stepping switch S. This division is carried out by a step-by-step rotation of the shaft 9 of escapement V1, from its position at the end of a line composing operation, until the blade of switchbank U2 of the line length counter reaches its end contact point, each step advance of the shaft 9 being controlled by the word space counter S and being equal to $s$ escapement units where $s$, as stated above, is the number of word spaces in the composed line. The number $n$ of step advances is counted in the word space selector SS, and the blade of the bank SS2 is thereby adjusted to determine the widths of the word spaces in the line that is printed on the justifying typewriter JT.

The quotient $$\frac{u}{s}$$

of the line shortage divided by the word spaces may or may not be a whole number, but the computation with stepping switches will determine the number $n$ of step advances of shaft 9 that is required to register a total number of escapement units equal to the desired line length plus not more than $s$ escapement units. Further justification is obtained by adding $(n-1)$ escapement units to all word spaces when the quotient of the justification computation is a whole number, and by adding $(n-1)$ units to some word spaces and $n$ units to other word spaces when the quotient is not a whole number, i. e. when the computation terminates at a registered line length that exceeds the desired line length by less than $s$ escapement units.

The justification computing mechanism is placed in operation upon the energization of the carriage return relay CR at the completion of the recording of a composed line in one of the memory units. As stated above, the initial position of the blade of switch bank U2 is illustrated in Fig. 2b, and the recording of the composed line length will move the blade of the bank U2 towards but to a point short of its end contact that is connected to the relay K. The energization of the carriage return relay CR opens the inner contacts of relay CR, thereby opening the lead 62 to the homing circuit of the stepping relay SS of the word space selector. The two adjacent sets of switch contacts of relay CR close to connect the + terminal to the lead 51 that extends to the outer blade of the relay K, Fig. 2b, and to the lead 54 in the holding circuit of relay CR that extends through the normally-closed outer contacts of the impulse relay I and lead 69 to the slow-acting impulse relay IS that has normally open contacts for closing the circuit to relay I.

The relays I, IS thus pulsate and the intermediate blade of the relay I moves back and forth to supply current pulses in alternation to lead 48 that extends to the variable escapement V1 through the bank S2 of the word space counter, and to lead 64 that extends to the stepping relay SS of the word space selector. The current supply to this blade of the impulse relay I is through the inner set of normally open contacts of relay CR, lead 51, the outer contacts of the deenergized relay K, lead 50, the outer contacts of the deenergized relay R', and lead 49. The supply of current pulses to escapement V1 and to the word space selector SS will therefore be interrupted by the energization of relay K.

Each current pulse to escapement VI corresponds to an increase in the measured line length by the addition of one escapement unit to each recorded word space, since the advance of the shaft 9 is controlled by the stop solenoid 10 that is selected by the adjustment of the word space counter S, and the number of steps is registered in the word space selector SS. The primary computation or stepping of the escapement VI and the word space selector SS continues until the additions to the initially registered line length result in a computed line length that is in excess of the desired value by $s$ or less than $s$ escapement units, where $s$ is the number of recorded word spaces. The shaft 9 is advanced upon the de-energization of its trip magnet 11, and the switch 13 closes each time the shaft 9 moves through its zero position, thereby transmitting a current pulse to the blade of the line length switch bank U2. The end contact of this bank is connected to relay K by the lead 16, and all other contacts are connected to the stepping relay U by the lead 17. The current pulses thereby impart step advances to the blade of the line length switch bank U2 until the continued advance of the shaft 9 effects that closure of switch 13 which results in the advance of the blade of the line length switch bank U2 to its end contact, thereby conditioning the system for the transmission of a current pulse to the relay K upon the next closure of the switch 13. The step advance of escapement VI and the word space selector SS then continues until the shaft 9 again sweeps through its zero position to close the switch 13. This closure of switch 13 sends a current pulse to relay K, and also to relays H and HS that are connected in series with relay K by lead 16'. Energization of relay K opens the current supply circuit to the intermediate blade of impulse relay I, and thereby stops the primary computation of line justification in the word space selector SS; and the energization of relay H completes circuits to reset the line length counter U and the word space counter S.

The energization of relay H connects the lead 18 to the + terminal, and thereby completes a circuit for energizing the stepping relay U through the normally closed contacts of the stop relay US and the normally closed contacts of relay U. The relay U thus takes up a rapid step-by-step operation to advance the blades of banks U1 and U2 until the blade of bank U1 reaches the hot contact to energize the relay US to open the supply circuit to the stepping relay U. The word space counter S is also reset to its zero point as the energization of relay H connects the + terminal to lead 47 that extends to the stepping relay S through the switch bank S1.

The number of steps $n$ of the word space selector SS is therefore equal to one more than the quotient of the line shortage $u$ divided by the number $s$ of word spaces, and the position of the blade of switch E at the completion of the primary justification computation indicates the excess line length that would result from the addition of $n$ escapement units to each word space. A second computation is initiated by the energization of relay K to measure this "negative remainder," i. e. to determine the number of word spaces that should receive only $(n-1)$ escapement units. The secondary computation system includes a stepping relay R with two banks R1, R2 of contacts, the number of contacts in each bank being equal to the number plus one of escapement units recorded by one revolution of the shaft 9 of escapement VI. The blade of switch bank R1 is connected to the + terminal, the home contact of the bank is connected by lead 71 to the inner blade of relay WS, and the remaining contacts are connected to the contacts of the switch E of the escapement VI. The end contact of bank R1 is open, the next prior contact is connected through lead 71 to the inner movable blade of the word space relay WS, and the second prior contact is connected to the second contact of the switch E. The first contact of switch E is open and, beginning with the second contact of switch E, its contacts in the direction of movement of the blade of switch E are connected to the second and other contacts of switch bank R1 as counted reversely to the direction of blade movement from the end contact of the switch bank R1. This reversal of connections between the contacts of the switch E and the contacts of switch bank R1 provides circuit connections by which contacts of switch E, as counted in the direction of the advance of that switch blade, are connected to the correspondingly numbered contacts of the switch bank R1 as counted contrary to the movement of that switch blade. For example, the contact of switch E in the fifth position beyond the zero contact of that switch is connected to the fifth contact short of the end contact of the switch bank R1.

As stated above, the shaft 9 of escapement VI is advanced upon the release of its trip magnet 11, and the blade of switch E therefore rests on a contact corresponding to not more than $s$, the number of recorded word spaces, at the completion of the primary computation. The blade of switch bank R1 is then stepped around by the secondary computing system to locate the position of the blade of switch E. The stepping relay R is energized by a circuit including its normally closed contacts, lead 72 to the front contact of the intermediate switch blade of relay K, and lead 73 to the back contact of the inner switch section of the relay R', the blade of that switch section being connected to the + terminal by the jumper connection 74 to lead 54 and contacts of relay CR. Lead 75 connects the blade of switch E to the back contact of the inner switch section of relay WS and to relay R'. The front contact of the inner switch section of relay R' is connected by lead 76 to the slow-acting relay RS and to the inner switch blade of that relay. The stepping relay R thus steps around rapidly until the blade of bank R1 reaches the contact that is connected to the switch E contact then engaged by the blade of that switch. A current pulse is then delivered to relay R' through lead 75, and the energization of relay R' in turn opens the current supply circuit to the stepping relay R and transmits a current pulse through the lead 76, the back contacts of slow-acting relay RS, jumper 77 and lead 43 to energize the resetting trip solenoid 11e of the escapement VI. The current flow through lead 76 also energizes the slow-acting relay RS and, when this relay pulls in after a slight delay, its inner set of contacts open to interrupt current flow to the jumper 77. The relay R' is locked in through its outer single-throw switch section that closes to complete a holding circuit through the jumper 55' and the lead 55 which is connected to the + terminal through the holding contacts of relay CR. Energization of relay RS opens the holding circuit of relays K, H and HS that was previously completed through the back contact of the outer switch section of relay RS.

The stepping of the relay R is interrupted when the blade of the bank R1 is short of its end contact by the number of steps that the blade of switch E is beyond its zero contact. The position of the blade of bank R1 is therefore a measure of the number of word spaces that should receive $(n-1)$ escapement units, and the control system for increasing the word space additions to $n$ units (when such increase is required for perfect justification) includes the following elements and circuit connections. The blade of switch bank R2 is connected to the + terminal, its last contact is left open, and the remaining contacts are connected to each other and, through lead 78 to the outer blade of relay WS. The associated front contact of the relay WS is connected to relay R by a jumper 79. Each energization of relay WS thus supplies a current pulse to relay R to effect a one-step advance of the blades of banks R1 and R2. Relay WS is energized at each entry of a word space in the transcribing of a line into the justifying typewriter JT, and relay R is thereby energized once for each transcribed word space. The blade R1 is advanced at each release of the stepping relay R, and the blade R1 therefore engages its next-to-the-end contact when the relay R is energized to make the last step that will move the blade R1 to the end contact. This condition results in the transmission of a current pulse to the stepping relay SS of the word space selector when the relay R is next energized to effect the final step of the blade R1; the current pulse being transmitted from the + terminal through the blade R1, lead 71, the front contact of the inner switch section of relay WS, and leads 64′, 64. The blade of the switch bank SS2 is thereby advanced to the next higher contact to increase the width of any subsequently transcribed word space by one escapement unit.

The word space selector SS is reset at the completion of the transcribing of a recorded line through a circuit that includes the blade and switch bank SS1, lead 61 and the contacts of stepping relay SS, the inner switch contacts of relay CR, and leads 63, 64. The holding circuit of relay CR is broken by the energization of the end-of-line relay EL, and the contacts of relay CR then close to complete the homing circuit for the stepping relay SS.

*Non-justification*

Justification of the line length may not be desirable, for example in the typing of the short final line of a paragraph, and the apparatus therefore includes control circuits that prevent the described operations of the justification computing and control elements. The switch 80 is closed by depressing the "non-justifying" key, and connects the + terminal to the non-justifying relay 81 and, through lead 82, to the relays H and HS. Energization of these relays serves, as described above, to reset the word space counter S and the line length counter U. The normally open outer set of contacts of the relay 81 complete an energizing circuit for the relay R′, and thereby supply a current pulse to the trip magnet 11e to reset the escapement mechanism V1. This circuit includes leads 55″ and 75′ that extend from the contacts of the relay 81 to the lead 55 (that is connected to the + terminal through the contacts of relay CR) and the energizing lead 75 of relay R′, respectively. The blade of the normally open inner set of contacts of relay 81 is connected by lead 83 to the relay CS, and relays CS and CR are thereby energized when the non-justifying key is depressed.

The same resetting operations take place when the "error" key switch 42 is closed as the error relay 41 is connected in series with relays H and HS by jumper 84 and lead 82. The energization of the error relay does not, however, energize the carriage return relay CR.

*Carriage escapement control*

A portion of the circuits for controlling the advance of the carriage escapement V2 by switch bank SS2 is shown diagrammatically in Fig. 3. The first few contact points of the switch bank are consecutively numbered on the drawings, the "home" contact is identified by the character $h$, and the carriage advance resulting from the energization of the several stop solenoids 10′ of the carriage escapement is indicated, in escapement units, by the numerals below the respective stop solenoids.

The illustrated escapement control is based upon a measurement, in the line length counter U, of 4 escapement units for each word space that is recorded in the line. The contact point "1" of the switch bank SS2 is connected by a line of the cable 67 to the stop solenoid 10′ that will limit the carriage advance to 4 escapement units, and the subsequent contact points are connected in sequence to other stop solenoids 10′. The particular carriage escapement that will be described hereinafter provides a maximum word space width of 15 escapement units, and the "12" contact of the switch bank SS2 is therefore connected to the stop solenoid 10′, not shown in Fig. 3, that sets the escapement V2 for an advance of 15 units.

The justification computing system will impart at least one advance to the blade of the switch SS2 even in the case of a composed line of exactly the desired length, and the described circuit connections add $(n-1)$ units to the recorded word space width of four escapement units when the blade engages the contact $n$ corresponding to the number of steps in the primary computation of justification. The illustrated position of the blade on contact "1" indicates that at least some of the word spaces of the typed line will not be increased above their recorded value of 4 escapement units. In the special case of a composed line of exactly the desired line length, no justification is required and the blade of switch bank SS2 will remain on the "1" contact throughout the transcribing of the recorded line. In the case of a line shortage of $u$ escapement units, the relay R makes one step for each transcribed word space and the blade of bank R1 reaches its home point to transmit a current pulse to relay SS during the transcribing of the recorded line. The resulting advance of the blade of bank SS2 to the next higher contact will condition the next higher stop solenoid 10′ for actuation upon the transcribing of the remaining word spaces.

The blade of switch bank SS2 remains at its home contact $h$ when the non-justifying key switch 80 is closed to initiate the transcribing of the recorded line. Contact $h$ is connected to contact "3," and the width of each word space is therefore equal to 6 escapement units when the recorded line is transcribed without justification.

*Transcribing from memory unit*

As described above, the energization of the carriage return relay CR supplies current to the pulsating relays I, IS to effect the justification computing operations. The relays I, IS also supply current pulses to the record-advancing solenoid of the memory unit in which the line or series of key actuations was recorded. The relay CR is shown as de-energized in Fig. 2a, and this condition corresponds to the completion of a transcription from memory unit M" into the justifying typewriter JT. When relay CR was first energized at the completion of a recording in memory unit M", the solenoid 56 was energized to open the circuit to solenoid 59, thereby to adjust the switches of transfer device Tr for a recording in the memory unit M' and a transcription from memory unit M".

The impulse relays I, IS were energized, as stated above, when the carriage return relay CR was energized, and the "hot" lead 54 was intermittently connected by impulse relay I to lead 37 that extends, through contacts of relay 29', lead 35' and switch section 28 of the transfer device, and lead 27" to the record-advancing device 26" of memory unit M". The recording bands were thereby stepped around to bring the first recorded signal immediately adjacent the decoding switches 20. The clutch switch 32" was then opened by the measuring device to open the energizing circuit of relay 29", whereby the switch blades of that relay assumed their illustrated positions. The further transport of the recording bands by current pulses to the solenoid 26" resulted in closures of the decoding switches 20 and the transmission of code signals to the decoding relays D to energize the type bar actuating solenoids of the justifying typewriter JT. The recorded line was transcribed, with the word space widths adjusted as previously described for justification of the line, and the final line signal energized the end-of-line relay EL and transmitted a current pulse to the magnet O of the justifying typewriter to return the carriage. The energization of the relay EL opens the holding circuits of the relays CR and R'. The de-energization of relay CR closes the homing circuit of the stepping relay SS, and the blades are advanced until the blade of switch bank SS1 reaches its last or home contact.

All parts of the apparatus are then in the positions illustrated and in condition for initiation of a recording of a series of key operations in the memory unit M'.

Decoding relays

The circuits of the decoding relays D, the decoding switches 20 of memory unit M", and typical character and operations-controlling solenoids are illustrated in Fig. 4. The decoding switches 20 of memory unit M" are connected to the front contacts of the switch section 23 of the transfer device Tr, as illustrated in Fig. 2c, and the decoding switches of memory unit M' (not shown in Fig. 4) are connected to the back contacts. The closure of one or more of the six decoding switches 20 results in the selective energization of the decoding relays D1—D6 that each have double throw switches, i. e. a blade or blades moving between front and back contacts in accordance with the energized or de-energized condition of the relay.

The first stage of the decoding relay system comprises the relay D1 that is energized by a closure of the "1" decoding switch 20 to move the single movable blade of the relay to energize its front contact, the blade being connected to the + terminal through lead 86 to the inner normally open switch section of the impulse relay I. The second stage includes two movable switch blades that are connected to the front and back contacts, respectively, of relay D1 of the first decoding stage, and the third stage includes four movable switch blades connected to the several front and back contacts of the second selection stage. This geometric expansion of the code selection network will require 32 movable blades in the sixth stage if the maximum number (64) of code selections are desired. A lesser number of code selections is sufficient for the usual typewriter keyboard, and some of the circuits of Fig. 4 are therefore by-passed around certain selection stages or relay switches. For example, at the central portion of Fig. 4, the lead corresponding to the code selection "456" does not extend through the switches of relays D2 and D3 in the fifth and sixth selection stages. This means that the code combinations "2456," "3456" and "23456" are not employed to identify key operations.

A single relay may be employed for each selection stage but considerable power would be required to operate the final stage relay which, as indicated above, would have about 30 movable blades. It is convenient to employ a number of commercial telephone art relays of the four-pole double-throw type, and to "reflex" the geometrically expanding code selection network to obtain some equalization of the number of relays D2 to D6 that are controlled by the switches 20 that correspond to the code identifications "2" to "6" respectively. This reflexing is effected, as illustrated in Fig. 4, by connecting the back contact of relay D1 to a blade of a relay D6, and connecting the front contact of relay D1 to a blade of a relay D2. Since the relays D2 and D6 are of the four-pole type, the remaining movable blades of these relays are available for inclusion in subsequent code selection stages. For clarity of illustration, the six code selection stages are shown as laterally spaced rows of groups of vertically alined relay switch systems, and those relays that have switch contacts in different stages are illustrated in solid line in one stage and in dotted line in the other stages. For example, the three double-throw switches at the bottom of the final selection stage and the upper switch system of the second selection stage are controlled by a single relay D6. Similarly, the relay D2 that is shown in solid line in the second selection stage has three movable switch blades in the fifth stage, as is indicated by the dotted line showing of a relay D2 in that stage.

The distribution of decoding relays D2 to D6 in the different code selection stages may be varied and the arrangement shown in Fig. 4 is to be understood as illustrative of one practical system for reducing the number of "standard" relays of identical design that are required in a code selection system of several stages. As illustrated, the third selection stage includes relays D3 and D5 that have other contacts in the sixth and the fifth selection stages, respectively. The fourth selection stage includes two relays D4 and the fifth selection stage includes a relay D2, a relay D5, and some of the contacts of other relays D2 and D5. The sixth selection stage comprises three relays D3, three relays D6, and some contacts of additional D3 and D6 relays.

The several code combinations that may be established by the closure of one or more of the six decoding switches are indicated in Fig. 4, and the circuits corresponding to some code selections are illustrated. The majority of the code selection circuits extend to solenoids that actuate type bars of the justifying typewriter, for example the code line "25" is connected to the solenoid Oa that actuates the a type bar. The other terminal of solenoid Oa extends through lead 87 to the switch system of the "upper case" relay UC and then through the selected line of the escapement control cable 8' to stop solenoids 10' of the second variable escapement V2, see Figs. 2c and 3. The "shift" solenoid OU and the relay UC are in series and energized through the decoding line "2," and the contacts of relay UC complete a holding circuit for solenoid OU and relay UC that includes the normally closed contacts of the "lower case" relay LC. The relay LC is energized through the code line "5" to open the holding circuit of the upper case relay and solenoid, thereby permitting return of the carriage to its normal lower case position.

The word space relay WS is energized through the decoding line "1" and lead 65. As described above, the circuit of relay WS is completed through the blade SS2 of the space selector switch, a line of the escapement control cable 67, and the carriage escapement mechanism V2 of the justifying typewriter JT. The end-of-line relay EL is energized through the decoding line "4" and lead 60, and its circuit to ground is completed through the lead 60' and the solenoid O that trips the carriage return mechanism of the typewriter.

Line length and word space index

Figure 6:
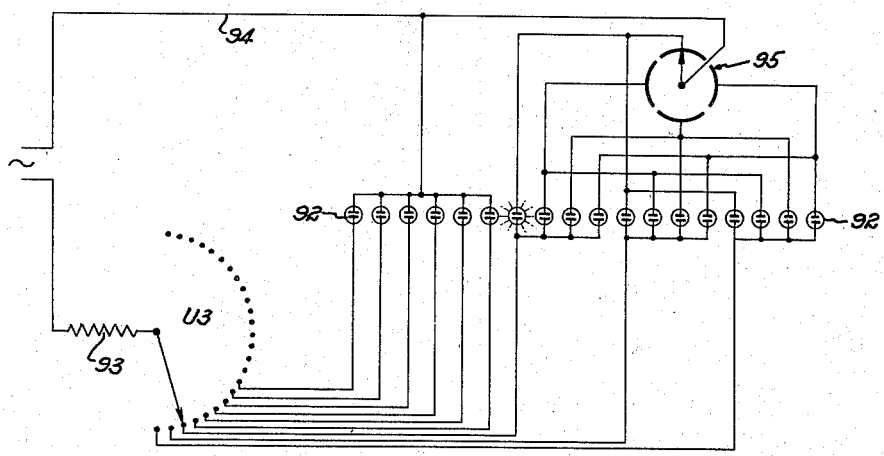
Figs. 6 and 7 are circuit diagrams of the line length and word space indexes, respectively.
Figure 7:
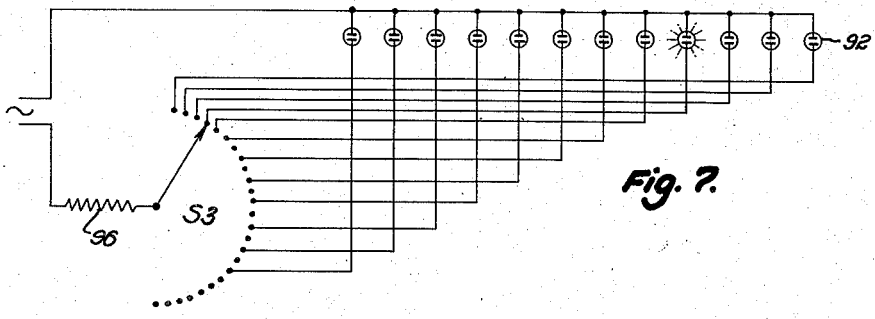
Figure 5:
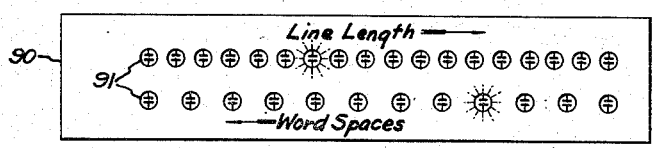
Fig. 5 is an elevation of the line length and word space index.

An index is provided on or above the keyboard to register the length of the composed line and the number of word spaces. This index, Fig. 5, is preferably an elongated opaque panel 90 with two rows of apertures 91 behind which small neon lights 92, see Figs. 6 and 7, are arranged. The legends "Line length" and "Word spaces," and the arrows adjacent the rows of openings indicate that increments in the line length and in the number of word spaces are measured from opposite ends of the panel. The amount of justification that can be added to a composed line depends upon the number of word spaces in the line and, for any given line shortage, there must be a certain number of word spaces for justification. The reversed sense of measurement of the line length and the number of word spaces provides the operator with a definite indication as to the possibility of justifying the composed line as the lighted neon tube of the word space index will be at the left of the lighted tube of the line length counter when there are sufficient word spaces for the justification of the composed line.

As shown in Fig. 6, the neon tubes 92 of the line length index are controlled by a switch bank U3 of the stepping switch U of the line length counter. The blade of this switch bank is connected to one terminal of a 110 volt alternating current source through a resistor 93 of about 100,000 ohms. The first portion of the line length is not registered in the index since the composed line length must be approximately the desired line length before justification is possible. The first neon lamp may be connected to the "17" contact of bank U3, which contact respresents an accumulated line length of 42 out of the possible 50 rotations of the escapement shaft 9, each rotation being the equivalent of 20 escapement units. A number of the adjacent contacts, each representing an additional rotation of the shaft 9, are connected to individual neon lamps 92 but the final switch contacts of bank U3 are each connected to four neon lamps in parallel, the correspondingly arranged lamps of each group being returned to the other terminal 94 of the alternating current source through the four segments of a rotary switch 95 which has a contact arm fixed to the shaft 9 of the variable escapement V1. The final portion of the composed line is thereby registered in terms of quarter-rotations of the shaft 9, i. e. the lamps are lighted in succession upon line length increments of four escapement units. Inspection of the wiring will show that "sneak" circuits are established through the contacts of the switch 95, each sneak circuit including three neon tubes in series with each other and shunted across the neon lamp that is directly connected between the "hot" contact of the switch bank U3 and the segment of switch 95 that is engaged by the rotary switch arm. The lamps of these sneak circuits will not be lighted as the voltage drop across each of the three lamps in series is not sufficient to establish conduction.

The lamps 92 of the word space index are controlled by the bank S3 of the word space counter S. The blade of switch bank S3 is connected to a terminal of a 110 volt alternating current source through a resistor 95, and contacts of the bank S3 are connected to the lamps 92 that have a common return lead to the other terminal of the current source. The number of registered word spaces may be in excess of the number of neon lamps 92 in the word space index when, as shown, only the first group of switch contacts are individually connected to neon lamps, and alternate contacts of the switch bank S3 are left open in the upper range of word spaces.

Special keys

As is customary in electrically actuated typewriters, the keyboard KS will have the usual tabulating keys and paper advance key but the switches and circuits of these keys are not illustrated as their coding relays are similar to the coding relays of the several characters except that they do not include an escapement control switch section e. Paragraph indentations are provided by a tabulation key that registers a blank space of a definite number of escapement units, for example 18 escapement units, in the variable escapement mechanism V1 and places a code signal on the associated memory unit for the entry of a blank at the beginning of the transcribed line.

First variable escapement

Figure 12:
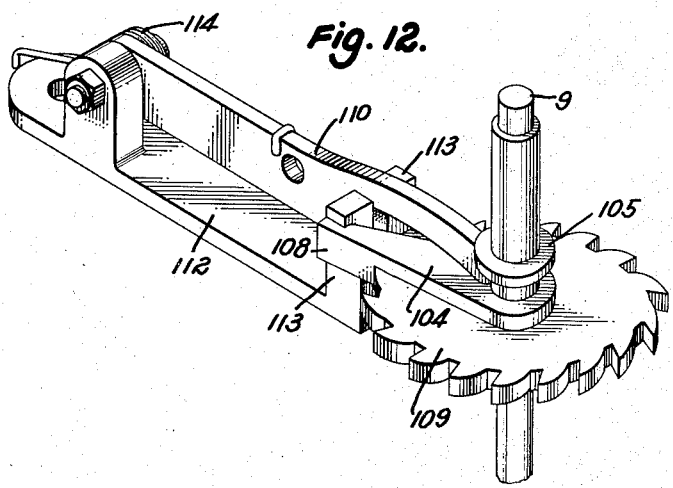
Fig. 12 is a perspective view, on a greatly enlarged scale, of the clutch-controlling elements of the escapement mechanism.
Figure 12A:
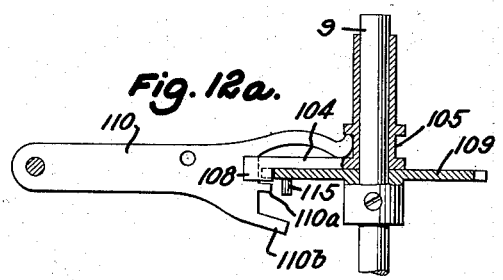
Figs. 12a and 12b are fragmentary side elevations illustrating the clutch-controlling elements in different positions of adjustment.

Appropriate physical structure for the variable escapement V1 is illustrated in Figs. 8 to 12b inclusive. The shaft 9 is journalled in a base plate 98 and sub-base 99 that is supported from the base plate by pillars 100. The trip solenoids 11, 11e and the stop solenoids 10 are supported on the base plate 98, the armatures of solenoids 10 carry or otherwise actuate stop rods 101 that extend through an arcuate wall 102 and are normally retained in retracted, inoperative position by springs 103. The stop rods 101 cooperate with a stop arm 104 that is slidably and rotatably supported on the shaft 9 by a hub 105, the arm being urged in a counterclockwise direction by a relatively light torsion spring 106 that is anchored on the lift bar 107 that extends between the armatures of solenoids 11, 11e. The arm 104 has a depending lug or tooth 108 that seats between teeth of the escapement wheel 109 of shaft 9 when the arm 104 is in normal position, Figs. 12 and 12a. The hub 105 is displaced axially to move the lug 108 away from wheel 109 by the trip lever 110 that is coupled to the lift bar 107 by a stiff spring 111, the lever being pivoted on a strap 112 that has an upturned flange 113 that is notched to receive and guide the lever 110. The lever 110 is yieldingly retained in normal position by a spring 114, Fig. 10, and is lifted into the position shown in Fig. 12b when the trip solenoid 11 is energized or, alternatively, into a somewhat higher position when the trip solenoid 11 and the resetting solenoid 11e are simultaneously energized.

Figure 12B:
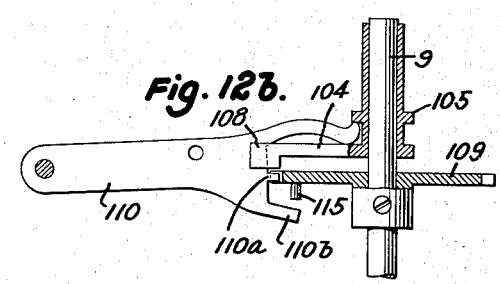

The lever 110 has a finger 110a that normally lies below the escapement wheel 109 and moves into an intertooth space of the escapement wheel when the lever 110 is lifted by the solenoid 11, Fig. 12b. The finger 110a thus locks the wheel 109 against rotation when the stop arm 104 and its lug 108 are lifted for a controlled advance of the escapement wheel 109. The trip lever 110 has a second and longer finger 110b that is raised into position to engage a resetting stop 115 on the wheel 109 when the lever 110 is lifted simultaneously by solenoids 11 and 11' for a resetting of the escapement mechanism at the end of a computation of the justification. The fingers 110a and 110b are so spaced that the finger 110a clears the wheel 109 after the finger 110b is in position to engage the resetting stop 115.

The shaft 9 is urged clockwise, as viewed in Figs. 8 and 10, by a torsion spring unit 116 that is continuously maintained in wound condition by shaft 117 of a motor, not shown in Fig. 9, that is controlled by switch 118 which is actuated by a nut 119 that travels along the threaded end of shaft 9. The nut 119 and spring unit 116 have cooperating members 120 for rotating the nut 119 on the shaft 9 to displace the nut axially to open the switch 118 when the torsion spring unit is fully wound. Step rotations of shaft 9 displace the nut axially in the opposite direction to close the motor switch 118 before the torsion spring is fully unwound. The general design and structural details of motor-operated spring drives of this type are well known in various arts.

The end of the stop arm 104 normally engages the right edge of the flange 113 of strap 112 to prevent clockwise rotation of shaft 9 by the spring drive mechanism, since the lug 108 of arm 104 is engaged with the escapement wheel 109. Upon energization of a stop solenoid 10, for example the trip solenoid for 6 spaces which is shown in actuated position in Fig. 8, the associated stop rod 101 is moved inwardly and the trip solenoid 11 is simultaneously energized to lift the trip lever 110 into the position shown in full line in Fig. 12b. The lifting of lever 110 frees the lug 108 from the escapement wheel 109, and the stop arm 104 is rotated counterclockwise by spring 106 to engage the projected stop rod 101. The escapement wheel 109 is locked against rotation at this time by the finger 110a of the lever 110. Upon de-energization of solenoids 10 and 11, the lever 110 is returned to normal position to engage the lug 108 of stop arm 104 with the escapement wheel. The torsion spring unit 116 then rotates the shaft 9 and wheel 109 clockwise until the stop arm 104 engages the flange 113 of the strap 112.

A shock-absorbing system for cushioning the impact of arm 104 on flange 113 is provided by pivoting the strap 112 on a stud 121 for angular movement in frictional engagement with a leaf spring 122, the strap 112 being normally retained in radial alinement with the shaft 9 by a spring 123 that urges the strap 112 towards an abutment or stop 124. The flange end 113 of the strap 112 is driven towards the left, Fig. 10, when it is hit by the end of the stop arm 104, and the energy stored in the rotating stop arm and associated elements is dissipated in moving the strap 112 angularly with respect to the friction spring 122 and in compressing the spring 123. The spring 123 is relatively stiff and restores the strap 112 to normal position when it is displaced, as shown in Fig. 10, by the stop arm 104.

The illustrated escapement wheel 109 has 20 teeth but the maximum escapement step is only 18 teeth since the stop flange 113 prevents a complete rotation of the stop arm. The left face of the flange 113 is accurately located to serve as a stop for an escapement advance of 18 units when the solenoid 11 is energized without simultaneously energizing one of the stop solenoids 10. The 20-point switch E, see Fig. 2b, takes the form of a plate 126 of insulating material that is suspended below the base plate 98, a circular array of switch contacts 127 that extend through the plate 126, and a radial contact arm 128 carried by an insulating cylinder 129 that is fixed to the shaft 9, see Figs. 8 and 11. The circuit connection to contact arm 128 is through the collar 130 on the cylinder 129, and the brush contact 131.

The cam 14 for operating the switch 13 of the line length counter is integral with the insulating cylinder 129. The switch 95 of the line length index, see Fig. 6, comprises the four quadrant contacts 95a on the insulating plate 126 and the contact arm 95b that is carried by the insulating cylinder 129 and fed through the slip ring 132 and brush 133.

*Carriage escapement mechanism*

The escapement mechanism V2 of the justifying typewriter, as illustrated in Figs. 13 and 14, is similar to the escapement mechanism of the line length counter and those elements of the carriage escapement that are substantially identical with elements of Figs. 6 to 12 are identified by primed reference numerals but will not be described in detail. The carriage escapement mechanism does not include switch systems corresponding to those of the escapement V1 that are illustrated in Fig. 11.

Figure 15:
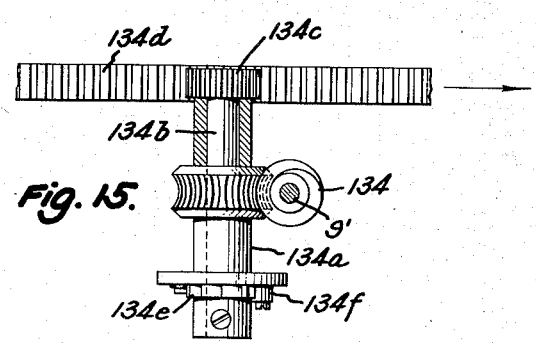
Fig. 15 is a fragmentary rear elevation of the carriage escapement rack and the pawl and ratchet connection between the same and the variable escapement mechanism.

The escapement shaft 9' is urged clockwise, as viewed in Figs. 13 and 15, by a torsion spring unit within the hollow pulley 116' that is driven from the motor 135 by a belt 136. The motor circuit includes the switch 118' that is controlled by the nut 119' that is displaced along the threaded sleeve 137 on shaft 9' in accordance with the stressed condition of the torsion spring.

Figure 15A:
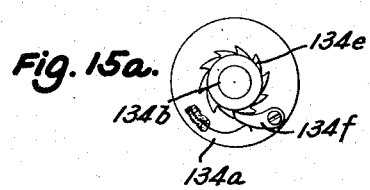
Fig. 15a is an end elevation, as seen from below, of the pawl and ratchet connection.
Figure 16:
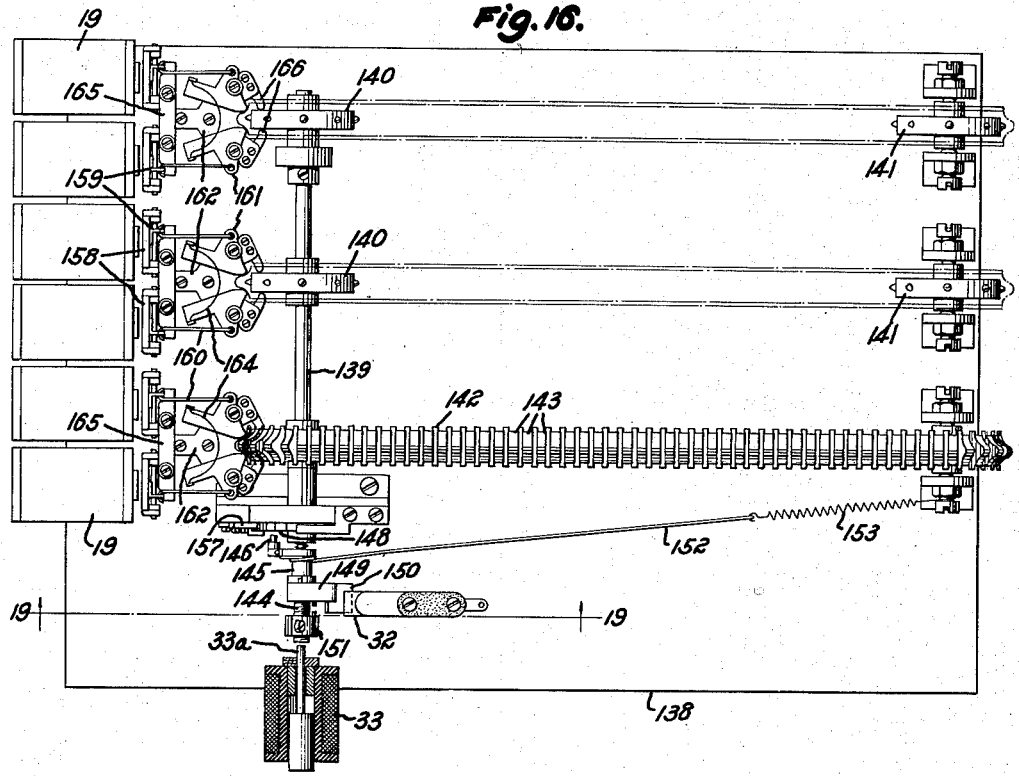
Fig. 16 is a plan view of one of the memory units.
Figure 17:
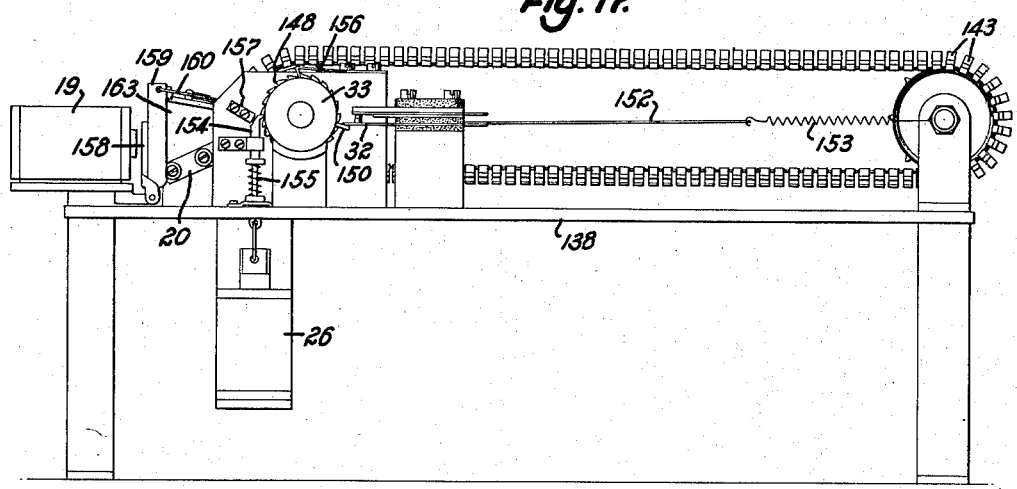
Fig. 17 is a side elevation of the same.

The worm 134 is fixed to shaft 9 and in mesh with the worm wheel section of a sleeve member 134a that is rotatable on and has a one-way pawl and ratchet connection to the escapement control shaft 134b, see Figs. 15 and 15a. The shaft 134b carries a gear 134c that meshes with the carriage escapement rack 134d that is urged towards the right, as viewed in Fig. 15, by the usual spring, not shown. A ratchet member 134e is fixed to the shaft 134a for cooperation with a pawl 134f that is mounted on the sleeve member 134a.

Each transcribing of a character or a word space from a memory unit energizes the carriage escapement control V2 to effect a predetermined measured rotation of the shaft 9', worm 134 and worm wheel member 134a. This permits a measured advance of the typewriter carriage. Upon energization of the end-of-line relay EL, the carriage return solenoid O and the resetting trip solenoid 11'e are energized. The sleeve member 134a and its worm wheel do not rotate upon this return movement of the carriage escapement rack 134d in view of the pawl and ratchet connection, but the sleeve member is reset to a definite zero position as it meshes with the worm 134 on the shaft 9' that has a definite zero position determined by a resetting stop similar to the above-described resetting stop 115 of the variable escapement VI. The left-hand margin of the printed matter may be adjusted in the usual manner by a movable stop member, not shown. This adjustment is relatively coarse and each adjustment step is equal to the number of escapement units (two units in the illustrated embodiments) corresponding to a one-tooth movement of ratchet wheel 134a with respect to the pawl 134f.

*Memory unit*

The memory unit or units which record the typewriter key operations and subsequently transcribe the recorded operations to the justifying typewriter may be of various types and of different designs in any selected type. A coding of the key operations is desirable to reduce the dimensions of the record medium but is not essential. The record medium may be of the closed band or rotating cylinder type, or may be an endless tape such as employed in teletype and cable transmission systems. The magnetic type of record tape is well adapted for use in the memory units but, as a typical embodiment of the invention, a mechanical type of recording system is illustrated in Figs. 16 to 25 inclusive.

The memory units M', M'' are of identical design and all parts of each memory unit are assembled on a base plate 138. A drive shaft 139 carries three toothed pulleys 140, and three idler pulleys 141 are individually mounted in spaced relation to the driving pulleys. Endless notched bands 142, with openings to take the teeth of the pulleys, extend around the cooperating sets of driving and idler pulleys, and resilient recording clips 143 are mounted upon the bands. The clips fit within the lateral notches of the bands and have inturned ends 143a that retain the clips on the bands, the sides of the clips having inwardly extending ridges 143b, see Figs. 24 and 25, that permit a seating of either edge of a clip 143 in alternative positions with respect to its supporting band 142. Six recording magnets 19 are arranged across the ends of the recording bands for adjusting the clips, as will be described in detail hereinafter.

The reduced diameter end of the shaft 139 extends into the bore of, and rotatably supports, a sleeve that has a threaded portion 144, a spool portion 145 and a clutch pin 146 for seating within an aperture 147 of the band-advancing ratchet wheel 148 that is secured to the drive shaft 139. A nut 149 is loosely threaded on the threaded sleeve portion 144 and may be normally held against rotation, by gravity, by its radially extending lug 150 that serves as an actuator for the clutch switch 32. The sleeve member is moved axially into clutch-engaging position by the rod extension 33a of the armature of the clutch solenoid 33, Fig. 16, and is released by the spiral spring 139' when the solenoid 33 is de-energized. The nut 149 must turn with the threaded sleeve portion 144 when rotation of the latter within the nut has carried the pins 149a into engagement with a radially extending stop surface 145a on the spool portion 145 or with a stop pin 149b on the split collar 151 that is adjustable along and clamped to the threaded sleeve, Fig. 19a. A cord 152 is wound upon the spool section 145 during the advance of the bands 142 when the clutch pin 146 locks the sleeve to the ratchet wheel 148, the cord being tensioned by a spring 153 to rotate the sleeve counterclockwise when the clutch pin 146 is freed from wheel 148 by the de-energization of the clutch solenoid 33.

The clutch elements are illustrated in Figs. 16 to 19 in the positions that they assume at the close of a resetting operation. The spring 153 and cord 152 rotated the sleeve until the threaded portion 144 turned within the nut 149 to bring the stop 145a of the spool against the pin 149a of the nut, and the nut then turned with the sleeve until the lug 150 engaged the lower face of the blade of switch 32 to stop the rotation. Upon the next recording in the memory unit, the clutch solenoid 33 will be energized and the sleeve will be locked to the ratchet wheel 148 by the clutch pin 146. The threaded sleeve portion 144 will then rotate clockwise, Figs. 19 and 19a, and the lug 150 of nut 149 will be below the nut upon the completion of the first quarter-turn of the threaded portion 144. The weight of the lug 150 may prevent rotation of the nut 149 for a limited period if the nut is loosely threaded on the portion 144, or the nut may turn with the threaded portion 144 until lug 150 engages the upper face of the blade of switch 32. In either event, the nut 149 will not develop sufficient pressure of lug 150 upon switch 32 to open the same until the continued rotation of portion 144 brings pin 149a into engagement with the pin 149b of the stop collar 151. The nut will then rotate with the ratchet wheel 148 to force the lug 150 clockwise with sufficient force to deflect the movable blade of switch 32 and open the latter. The opening of switch 32 de-energizes the clutch solenoid 33, thus releasing the clutch pin 146 from the ratchet wheel 148, and the tensioned cord 152 then rotates the armature sleeve to restore the several parts to their illustrated positions.

The sliding pawl 154 of the hand-advancing mechanism is moved downwardly by the solenoid 26, see Figs. 18 and 19, to engage the next tooth of the ratchet wheel 148 and to compress the spring 155 that imparts the active stroke to the pawl upon the de-energization of the solenoid. A latch spring 156 engages the wheel 148 to prevent reverse rotation, and a stop 157 is positioned adjacent the free end of the pawl 154 to hold the same against the ratchet wheel, thereby to prevent an over-running of the ratchet wheel and recording band system.

The mechanism for selectively displacing the opposite edges of the recording clips 143 with respect to the endless bands 142 is shown in detail in Figs. 20 to 22 inclusive. Two coding magnets 19 are associated with each band, and their armatures 158 have extensions 159 coupled by links 160 to the oppositely arranged recording levers 161. The levers are mounted upon the arms of a Y-shaped plate 162 that is supported above the base plate 138 by a pillar 163. The rounded ends of the levers 161 are normally held out of engagement with the clips 143 by a spring 164 which spreads the ends of the levers 161 apart and thus draws the armature extensions 159 into engagemen with a stop bar 165 that is mounted on the plate 162. Upon energization of a recording solenoid, the associated lever 161 is rocked to press the rounded lever end against the adjacent side portion of the clip 143 with a rubbing motion that forces the clip towards and laterally of the supporting band 142. The ridge 143b is forced beneath the band 142, and the resilient clip then contracts to seat the inner groove of the clip against the band 142, see Figs. 21, 24 and 25.

The flanged ends 143a of the code-recording clips are thus displaced inwardly in accordance with the code-selected energization of the six solenoids 19, and the displaced ends 143a actuate the decoding switches 20 during the transcribing from the memory unit. The decoding switches 20 are mounted upon opposite sides of the pillars 163, and spaced from the recording levers 161 by two "steps" of the band travel. Resetting horns 166 project forwardly from the arms of the plates 162 to engage the rounded advance edges of the displaced flanges 143a as the bands are advanced one step beyond the stage at which the flanges actuate the decoding switches. The horns 166 are appropriately shaped to force the edge of the clip laterally and outwardly to carry the ridge 143b beyond the outer face of the band 142.

*Error control in memory unit*

The adjustable collar 151 is so positioned on the threaded sleeve portion 144 that the lug 150 of nut 149 opens the clutch switch 32 when the recording bands have advanced two steps less than one complete cycle, i. e. when the set of clips 143 that recorded the first code combination after the energization of the clutch solenoid 33 are under the decoding switches. The supply circuit to the decoding switches is open so long as the clutch solenoid 33 is energized, and the clutch switch 32 opens to de-energize the solenoid 33 only when the recording bands have advanced, after the energization of the solenoid 33, to bring the first recorded signals into position under the decoding switches. The clutch solenoid 33 may be de-energized to terminate a recording cycle by closing the "Error" key switch 42; thereby energizing relay 41 which short-circuits the clutch solenoid 33 through the grounded lead 40, switch section 39 of transfer device Tr and jumper 38' or 38" to the associated solenoid supply lead 31' or 31" respectively.

The clutch pin 146 is momentarily released when the "Error" key switch is closed, and the travelling nut 149 is thereby reset to its initial position. The clutch solenoid 33 is again energized upon the release of the "Error" key switch, and the parts are in condition to start the re-recording of the erased line. All clips 143 that were displaced prior to the actuation of the "Error" key switch will actuate the decoding switches 20 but no signals will be transmitted to the decoding relays until the clutch switch 32 is opened by the lug 150 of the nut 149.

*Operation*

The method of operation of the self-justifying typewriter will be apparent from the foregoing descriptions of operations of the principal components of the apparatus. The typist operates the keys of the keyboard KS in the usual manner, and the sequence of the key operations is recorded in one of the memory units M', M". The computation of the line justification is initiated by the closing of the carriage return switch 52, and transfer device Tr is simultaneously operated to condition that memory unit for a transcribing operation. The recording bands of the memory unit are advanced by current pulses from the impulse relays I, IS during the computation of the justification and, after the blade of the word space switch bank SS2 and the blade of the negative remainder counter RI have reached their computed positions, the further advance of the recording bands of the memory unit opens the clutch switch 32, thereby deenergizing the associated clutch relay 29' or 29" to connect the + terminal to the decoding switches 20. The subsequent step-by-step advances of the bands operate the decoding switches to transmit current pulses to the decoding relays D1 to D6, and the circuits thus established through the decoding network selectively energize the operating solenoids of the justifying typewriter JT in accordance with the sequence of key actuations that was previously recorded on the bands of the memory unit. The final coded signal of the composed line energizes the end-of-line relay EL and the solenoid 0 that trips the carriage return mechanism of the justifying typewriter. Energization of relay EL opens the holding circuit of the relay CR, and back contacts of the latter complete a homing circuit for the resetting of the word space selector SS.

The particular embodiment that is herein illustrated and described includes certain physical constructions and electrical circuits that were invented by Elihu Root 3rd, and that are specifically claimed in application Ser. No. 479,933 that he filed on March 20, 1943. It is to be understood that the invention is not restricted to the illustrated embodiment and that various changes may be made in the component parts, and in their designs and relationships without departure from the spirit of my invention as set forth in the following claims.

I claim:

1. In a self-justifying typewriter, the combination with a keyboard having keys corresponding to characters of different type face widths and to a word space of a preselected width, a memory unit and means for recording therein a sequence of key operations corresponding to the composing of a line of copy, a variable escapement unit for measuring the length of the composed line in escapement units, said variable escapement being selectively controlled by said keyboard to register the number of escapement units allotted to the individual characters and to the word space, and means for counting the number of word spaces in the composed line of copy; of a typing unit comprising a carriage having a variable escapement, and reproducing means selectively operable by said memory unit to transcribe the composed line of copy, said carriage escapement including a plurality of stop means selectively energized by the respective reproducing means for controlling the carriage movement for advances of different magnitudes equal to different integral multiples of the escapement unit corresponding to the number of escapement units allotted to the normal registered word space width and to the several characters; and justification introducing means controlled by said first variable escapement and said word space counting means to select, for energization by said word space reproducing means, escapement stop means other than the stop means corresponding to the normal registered word space width.

2. In a self-justifying typewriter, a keyboard including a plurality of keys corresponding to characters and to word space, a memory unit and means controlled by said keys for recording therein the sequence of key actuations corresponding to the composing of a line of copy, means including a variable escapement for measuring the composed line length in escapement units, said measuring means being selectively controlled by said keys to advance the variable escapement by the number of escapement units individually allotted to each character and to a word space of a preselected width, means for counting the number of word spaces in the composed line, a typing unit having operators individual to the several characters and to a word space, said typing unit including a variable carriage escapement with stop means selectively connected to said operators for carriage advances in integral multiples of escapement units, means controlled by said memory unit for actuating said operators of the typing unit in accordance with the sequence of key actuations previously recorded therein, and word space control means operative when the measured length of the composed line is less than a desired justified line length to adjust the connections of the word space operator to said stop means of said carriage escapement for a carriage feed at each transcribed word space equal to the preselected measured width of a word space plus an integral number of escapement units.

3. In a self-justifying typewriter, the invention as recited in claim 2, wherein said word space control means includes justification-computing means controlled by said measuring means and said word space counter for determining the integral number of escapement units to be added to the preselected measured widths of the word spaces of the composed line of the copy to expand the composed line length to the desired justified line length.

4. In a self-justifying typewriter, the invention as recited in claim 2, wherein said line measuring means and said word space counter each includes a stepping relay; and said word space control means comprises a stepping relay for dividing the difference between the measured line length and the justified line length by the number of recorded word spaces, the brush and contacts of said last stepping relay forming an adjustable connection between said word space operator and the several stop means of said variable carriage escapement.

5. In a self-justifying typewriter, the invention as recited in claim 2, wherein said line measuring means and said words space counter each includes a stepping relay; and said word space control means comprises a stepping relay for dividing the difference between the measured line length and the justified line length by the number of recorded word spaces, the brush and contacts of said last stepping relay forming an adjustable connection between said word space operator and the several stop means of said variable carriage escapement, means for determining the overjustification that would result from the addition of $n$ escapement units to all transcribed word spaces, and means to add only $(n-1)$ escapement units to certain of said transcribed word spaces to prevent overjustification.

6. In a self-justifying typewriter, the invention as recited in claim 2, wherein said word space control means includes justification-computing means controlled by said measuring means and said word space counter for determining the integral number $n$ of escapement units to be added to each word space $s$ of preselected measured width to expand the composed line length to a value equal to the desired line length plus not more than $s$ escapement units, negative-remainder computing means for determining the number $r$ of escapement units by which the transcribed line length would exceed the desired justified line length if $n$ escapement units were added to each word space of the composed line, and means for adjusting the carriage escapement to add $(n-1)$ escapement units to $r$ word spaces and to add $n$ escapement units to the remaining $(s-r)$ word spaces of the composed line of copy.

7. In a self-justifying typing apparatus, a keyboard, a typing unit including operators for transcribing characters and a word space, a carriage having an escapement including stop means individually connected to said operators to control the carriage advance by different amounts that each comprise a predetermined number of escapement units of fixed magnitude, a memory unit and means for recording therein signals corresponding to the sequence of key actuations in the composing of a line of copy, means controlled by the memory unit selectively to actuate said operators to transcribe the signals representing the keyboard-composed line to said typing unit, means for counting the number of word spaces in the composed line, means for registering the composed line length on a basis of word space widths of a preselected value, and means controlled by said registering means and said counting means for selecting stop means for connection to the word space operator for certain of said transcribed word spaces for a carriage feed equal to more than the preselected value of the measured word space width, thereby to pustify the transcribed line.

8. In a self-justifying typing apparatus, a keyboard, a typing unit having a variable carriage escapement mechanism and operators for transcribing characters and a word space, said escapement mechanism including a plurality of stop means individually controlled by said operators to determine the advance of the carriage in integral multiples of an escapement unit of fixed magnitude, memory unit means including recording means controlled from said keyboard for recording the sequence of key actuations in the composing of a line of copy, means for registering the length of the composed line and the number of word spaces therein, means operable automatically after the recording of a composed line in said memory unit means for connecting said memory unit means to the typing unit operators for transcribing the recorded sequence of key actuations to said typing unit, and means controlled by the registered line length and the registered number of word spaces for selecting for actuation in the transcribing of word spaces stop means for increasing the length of the transcribed line to a preselected line length value.

9. A self-justifying typewriter of the type including a keyboard, a memory unit for recording the sequence of key operations in the composing of a line of copy, a typing unit having a variable carriage escapement mechanism, means including word space and character operators for transcribing the record of key operations from said memory unit to said typing unit, means for measuring the length of the composed line, and justification computing means controlled by the length of the composed line and the number of word spaces for adjusting said carriage escapement for justification, characterized by the fact that said carriage escapement mechanism includes a plurality of stop means selectively energized by said operators for limiting the carriage advance to different integral multiples of an escapement unit of small magnitude, and said justification computing means includes means for selecting for energization one of said stop means in the transcribing of a word space, the selected stop means corresponding to a word space width in excess of the word space width registered in measuring the length of a composed line.

10. A self-justifying typewriter as claimed in claim 9, wherein said justification computing means includes means for selecting different stop means for energization during the transcribing of the record of key operations to said typing unit in the event that the composed line shortage divided by the number of word spaces is not a whole number.

11. A justifying typewriter of the type including a keyboard unit with character and operations keys, a memory unit and means for recording therein a sequence of signals corresponding to the key actuations in the composing of a line of copy, a typing unit including a variable carriage escapement, transcription-control means operable manually to initiate a transcription of the recorded sequence of signals to said typing unit, and correction means operable manually prior to said transcription-control means to prevent the transcription to the typing unit of signals recorded in said memory unit; characterized by the fact that said keyboard unit comprises a non-justifying typewriter for printing the composed line progressively with the key actuations of the keyboard unit, whereby the operator may inspect the printed line of the non-justifying typewriter for errors before operating the transcription-control means to initiate the transcription of the composed line to the justifying typing unit.

12. In a self-justifying typewriter, the combination with a keyboard unit including key-controlled electrical switches, coding relays individually controlled by the several switches for translating the key-switch signals into combinations of coded signal inputs to a multiple line coding cable, a memory unit including a record medium and means energized through said coding cable to enter on said record medium a sequence of coded signals corresponding to the key actuations in the composing of a line of copy, and means for registering the length of the composed line and the number of word spaces therein; and a justifying typing unit having a variable carriage escapement including a plurality of stop means selectively operable to limit the carriage advance to different multiples of an escapement unit, operators for transcribing the recorded key actuations to produce a typed line, a series of decoding switches operable by the coded signals recorded on the record medium of said memory unit, decoding relays selectively energized by said decoding switches selectively to transmit to the operators of said typing unit current pulses corresponding to the sequence of key operations in the composing of the line on the keyboard unit, justification computing means controlled by said registering means for computing the widths of word spaces for extending the transcribed line to a preselected justified length, and means controlled by said computing means for selecting the escapement stop means for controlling the carriage advance on the transcribing of a recorded word space.

13. A self-justifying typewriter of the type including a keyboard unit, memory means for recording a sequence of key actuations corresponding to the composing of a line of copy, a justifying typing unit having a variable carriage escapement, means operable after the recording of a complete composed line in said memory means to transcribe the composed line to said typing unit, and means controlled by the length of the composed line and the number of word spaces therein for adjusting said carriage escapement to justify the transcribed line during typing thereof on the typing unit, characterized by the fact that said memory means comprises a pair of independently operable memory units and a transfer device for connecting the memory units in alternation to said keyboard unit for the recording of key actuations and to said transcribing means for operation independently of said keys to transcribe a recorded sequence of key actuations to said justifying typing unit.

14. A self-justifying typewriter as recited in claim 13, wherein said keyboard unit comprises a non-justifying typewriter for producing a type copy of the line during the composing thereof on the keyboard unit.

15. In a self-justifying typewriter, a keyboard unit with keys operable to compose a line of copy, a pair of memory units, a typing unit including a variable carriage escapement, means for connecting said memory units in alternation to said keyboard unit and said typing unit, means controlled by said keyboard unit for recording in the associated memory unit a sequence of signals corresponding to the key actuations in the composing of a line of copy, means for registering the length of the composed line and the number of word spaces therein, computing means controlled by said registering means for determining the change in recorded word space widths required to justify the composed line, manually controlled means for recording an end-of-line signal on the memory unit then associated with the keyboard unit and for simultaneously energizing said computing means and for reversing the connections of said memory units to the keyboard and typing units, means controlled by said computing means for adjusting the variable carriage escapement, and transcribing means operable by the memory unit previously associated with the keyboard unit for transcribing the recorded sequence of key-actuation signals to said typing unit to type the composed line of copy.

16. In a self-justifying typewriter, a keyboard unit, a memory unit for recording a series of key actuations corresponding to the composing of a line of copy, a typing unit having a variable carriage escapement, means for transcribing a composed line from the memory unit to the typing unit, justification computing means controlled by the composed line length and the number of word spaces to regulate the carriage escapement to justify the transcribed line during typing thereof on said typing unit, and manually operable means for rendering said justification computing means inoperative.

17. In a self-justifying typewriter having a keyboard, switches individual to the keys of the keyboard, coding relays individual to said keys and energized selectively by a closure of the associated key-actuated switch, a memory unit comprising endless band means, means supporting said band means for a step-by-step travel from a recording station to a transcribing station, electrically operated means at the recording station and controlled by said relays for imposing on the band means signals indicative of key actuations, means at the transcribing station and operable by the imposed signals for producing current pulses for transmission to a typing unit, and means for erasing signals from said band means during its travel from the transcribing station to the recording station.

18. In a self-justifying typewriter, the invention as recited in claim 17, wherein said electrically-operated means comprises a plurality of solenoids, the number of solenoids being substantially less than the number of keys whose actuations are to be recorded, a coding network having an output line individual to each solenoid, and a source of current, certain of said coding relays having switch contacts for connecting said source of current to different single output lines and other coding relays having switch contacts for connecting said source of current to different combinations of said output lines.

VANNEVAR BUSH.